United States Patent
Asukai

(10) Patent No.: US 11,190,472 B2
(45) Date of Patent: Nov. 30, 2021

(54) CHANGING DISPLAY PROBABILITY OF POSTED INFORMATION ACCORDING TO RELATIONSHIP DISCONNECTION REQUEST

(71) Applicant: SONY CORPORATION, Tokyo (JP)

(72) Inventor: Masamichi Asukai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 7 days.

(21) Appl. No.: 16/478,270

(22) PCT Filed: Oct. 19, 2017

(86) PCT No.: PCT/JP2017/037876
§ 371 (c)(1),
(2) Date: Jul. 16, 2019

(87) PCT Pub. No.: WO2018/138985
PCT Pub. Date: Aug. 2, 2018

(65) Prior Publication Data
US 2019/0364008 A1    Nov. 28, 2019

(30) Foreign Application Priority Data
Jan. 27, 2017 (JP) .............................. JP2017-012956

(51) Int. Cl.
*H04L 12/58* (2006.01)
*G06Q 50/00* (2012.01)
*H04L 29/08* (2006.01)

(52) U.S. Cl.
CPC ............. *H04L 51/12* (2013.01); *G06Q 50/01* (2013.01); *H04L 51/32* (2013.01); *H04L 67/306* (2013.01)

(58) Field of Classification Search
CPC ....... H04L 51/12; H04L 51/32; H04L 67/306; G06Q 50/01
See application file for complete search history.

(56) References Cited

U.S. PATENT DOCUMENTS 9,509,643 B1 * 11/2016 Gade ....................... H04L 67/22
10,659,299 B1 * 5/2020 Winters .................. H04L 67/02
(Continued)

FOREIGN PATENT DOCUMENTS

| JP | 2010-237970 A | 10/2010 |
| JP | 2015-69232 A  | 4/2015  |
| JP | 5953417 B1    | 7/2016  |

OTHER PUBLICATIONS

Patterson, Ben, "3 ways to unfriend a Facebook friend without really unfriending them", Aug. 12, 2015, https://heresthethingblog.com/2015/08/12/3-ways-unfriend-facebook-friend/, pp. 1-6. (Year: 2015).*

(Continued)

*Primary Examiner* — Gregory G Todd
(74) *Attorney, Agent, or Firm* — Chip Law Group

(57) ABSTRACT

Proposed is an information processing system including an accumulation unit that accumulates friend information indicating a friend relationship between users registered in a social media service and posted information, and a control unit that performs, when receiving disconnection candidate user information from a specific user, the disconnection candidate user information indicating a user with which the specific user wishes to disconnect a relationship, control to store the disconnection candidate user information in association with the specific user, and performs, when receiving the posted information request from the user of the client device, control to reply to the user of the client device after filtering posted information posted by the specific user according to passage of predetermined time, depending on whether or not the user of the client device is included in disconnection candidate users indicated by the disconnection candidate user information stored in association with the specific user.

12 Claims, 24 Drawing Sheets

(56) References Cited

U.S. PATENT DOCUMENTS

| | | | | |
|---|---|---|---|---|
| 10,684,738 | B1* | 6/2020 | Sicora | G06F 16/435 |
| 10,795,936 | B2* | 10/2020 | Kalis | H04L 51/32 |
| 2009/0164574 | A1* | 6/2009 | Hoffman | H04L 65/403 |
| | | | | 709/204 |
| 2009/0265326 | A1* | 10/2009 | Lehrman | G06F 16/9535 |
| 2014/0379796 | A1* | 12/2014 | Altaf | H04L 63/10 |
| | | | | 709/204 |
| 2018/0197097 | A1* | 7/2018 | Chatterjee | G06N 5/003 |
| 2019/0364008 | A1* | 11/2019 | Asukai | H04L 67/306 |

OTHER PUBLICATIONS

International Search Report and Written Opinion of PCT Application No. PCT/JP2017/037876, dated Jan. 9, 2018, 06 pages of ISRWO.

* cited by examiner

FIG. 1
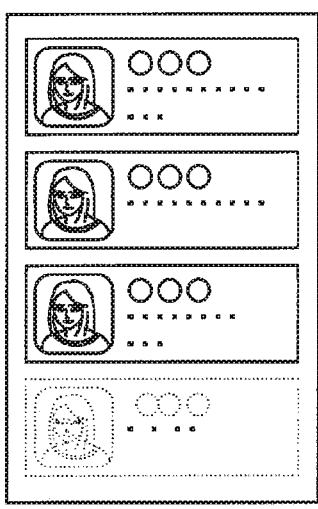
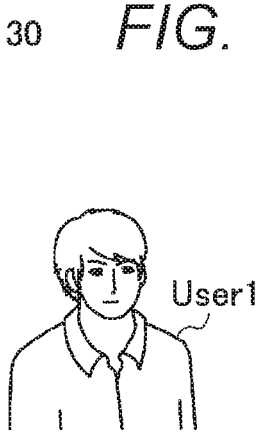
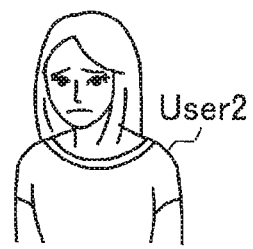
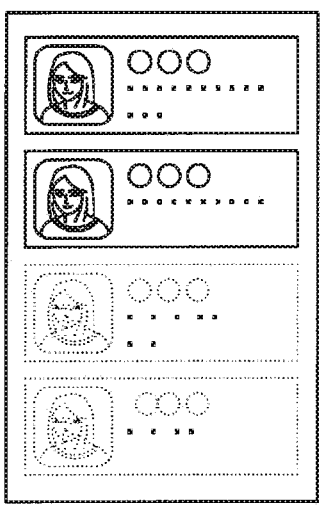
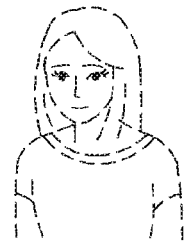
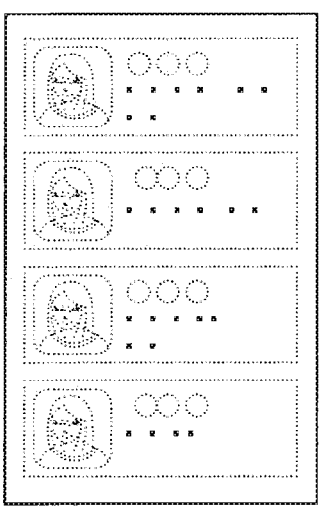
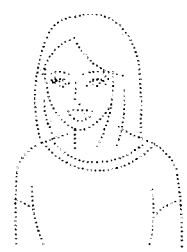

CHANGING DISPLAY PROBABILITY OF POSTED INFORMATION ACCORDING TO RELATIONSHIP DISCONNECTION REQUEST

CROSS REFERENCE TO RELATED APPLICATIONS

This application is a U.S. National Phase of International Patent Application No. PCT/JP2017/037876 filed on Oct. 19, 2017, which claims priority benefit of Japanese Patent Application No. JP 2017-012956 filed in the Japan Patent Office on Jan. 27, 2017. Each of the above-referenced applications is hereby incorporated herein by reference in its entirety.

TECHNICAL FIELD

The present disclosure relates to an information processing system and an information processing method.

BACKGROUND ART

In recent years, with the development of information processing technology and communication technology, individuals possess own communication terminals and many people become able to easily transmit and receive information via the Internet. Furthermore, a wide range of societies in which anyone can participate is connected using information transmission technology, and social media that enable interactive communication have been developed on the Internet.

For example, there is a social network service (SNS) that creates a specific community that connects specific people, such as friends, family members, and people in the area and enables interactive communication such as information exchange, information disclosure, and message exchange within the community. A user can be connected with friends, family members, and friends of friends on the Internet using the SNS, and can build a new relationship by the SNS.

With regard to deletion of contacts registered in such SNS, for example, Patent Document 1 below discloses deletion of contacts and messages registered in the social network service on a date specified by an individual.

Furthermore, in an electronic message board system on the Internet, Patent Document 2 below discloses that an administrator can perform setting of optionally displaying display of speech information to become gradually thinner with passage of time, and erasing the display after a predetermined time.

Furthermore, Patent Document 3 below discloses deletion of information of other users included in an address book according to the frequency of communication by communication means using a social network service.

CITATION LIST

Patent Document

Patent Document 1: Japanese PCT National Publication No. 2016-504684
Patent Document 2: Japanese Patent Application Laid-Open No. 2002-278874
Patent Document 3: Japanese Patent Application Laid-Open No. 2012-65270

SUMMARY OF THE INVENTION

Problems to be Solved by the Invention

However, the method of suddenly deleting the contact is not an amicable method when the user wishes to disconnect a relationship with the other side on the Internet. Furthermore, setting messages and posted information of the other side to be non-display is not an essential solution.

Therefore, the present disclosure proposes an information processing system and an information processing method capable of loosely disconnecting a relationship with the other side connected in a social media service.

Solutions to Problems

According to the present disclosure, provided is an information processing system including an accumulation unit configured to accumulate friend information indicating a friend relationship between users registered in a social media service and posted information posted by a user, a communication unit configured to receive a posted information request from a user of a client device and reply with the posted information, and a control unit configured to, when receiving disconnection candidate user information from a specific user via the communication unit, the disconnection candidate user information indicating a user with which the specific user wishes to disconnect a relationship, cause the accumulation unit to store the disconnection candidate user information in association with the specific user, and when receiving the posted information request from the user of the client device via the communication unit, cause the communication unit to reply to the user of the client device after filtering posted information posted by the specific user according to passage of predetermined time, depending on whether or not the user of the client device is included in disconnection candidate users indicated by the disconnection candidate user information stored in association with the specific user registered in the friend information of the user of the client device.

According to the present disclosure, provided is an information processing method, by a processor, including accumulating friend information indicating a friend relationship between users registered in a social media service and posted information posted by users in an accumulation unit, receiving a posted information request from a user of a client device and replying with the posted information via a communication unit, and when receiving disconnection candidate user information from a specific user via the communication unit, the disconnection candidate user information indicating users with which the specific user wishes to disconnect a relationship, causing the accumulation unit to store the disconnection candidate user information in association with the specific user, and when receiving the posted information request from the user of the client device via the communication unit, causing the communication unit to reply to the user of the client device after filtering posted information posted by the specific user according to passage of predetermined time, depending on whether or not the user of the client device is included in disconnection candidate users indicated by the disconnection candidate user information stored in association with the specific user registered in the friend information of the user of the client device.

Effects of the Invention

As described above, according to the present disclosure, a relationship with the other side connected in a social media service can be loosely disconnected.

Note that the above-described effect is not necessarily restrictive, and any one of effects described in the present specification or any another effect obtainable from the present specification may be exhibited in addition to or in place of the above-described effect.

BRIEF DESCRIPTION OF DRAWINGS

FIG. 1 is a diagram for describing an outline of an information processing system according to an embodiment of the present disclosure.

MODE FOR CARRYING OUT THE INVENTION

Figure 2:
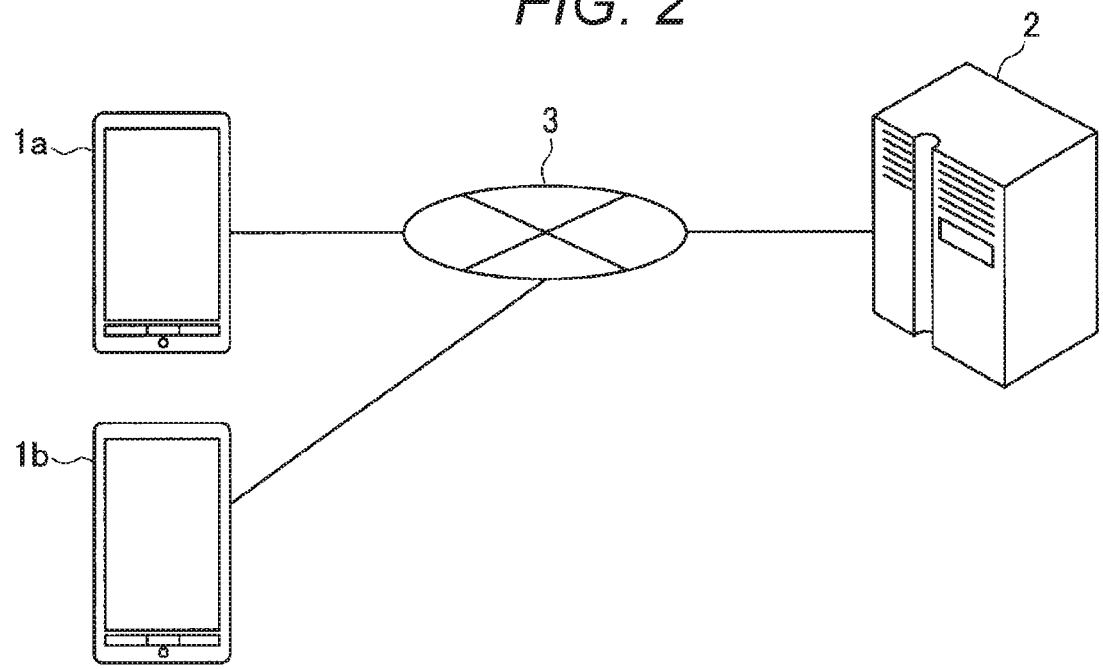
FIG. 2 is a diagram illustrating an example of an overall configuration of the information processing system according to the present embodiment.

Favorable embodiments of the present disclosure will be described in detail with reference to the appended drawings. Note that, in the present specification and drawings, overlapping description of configuration elements having substantially the same functional configuration is omitted by providing the same sign.

Furthermore, description will be given in the following order.

1. Outline of Information Processing System According to One Embodiment of Present Disclosure
2. Basic Configuration and Operation Processing
2-1. Configuration of Client Terminal 1
2-2. Configuration of Server 2
3. Embodiments
3-1. First Embodiment
3-2. Second Embodiment
3-3. Third Embodiment
3-4. Fourth Embodiment
3-5. Fifth Embodiment
4. Conclusion

1. OUTLINE OF INFORMATION PROCESSING SYSTEM ACCORDING TO ONE EMBODIMENT OF PRESENT DISCLOSURE

FIG. 1 is a diagram for describing an outline of an information processing system according to an embodiment of the present disclosure. As illustrated in FIG. 1, the information processing system according to the present embodiment enables a user 2 to loosely disconnect a relationship with a user 1 when the user 2 wants to disconnect the relationship with the user 1 on social media, in a state where the user 1 and the user 2 are connected by a social media service and posted information is visible by the other party.

Background

As described above, the method of suddenly deleting the contact is not an amicable method. Furthermore, setting messages and posts of the other side to be non-display is not an essential solution.

In other words, in the case of deleting the contact, for example, a possibility that posts of the user suddenly disappear on the other side and disconnection is noticed by the other side is high depending on the service of social media, and this is not an amicable method.

Furthermore, in the method of setting non-display to the posts of the other side, the posts of the other side become non-displayed for the user but the other side can see the posts of the user. Therefore, in a case where the other side inputs a comment on the post of the user, the user can see the commend and may feel unpleasant remembering the other side. Furthermore, the other side feels suspicious if the user does not reply to the comment of the other side. Therefore, there is a risk that connection is substantially reestablished when the user is forced to reply even if the user does not want to do so.

Therefore, the information processing system according to the present disclosure filters the posts of the user, which are viewed by the other side with which the user wants to disconnect the relationship, to be gradually non-displayed, and enables the relationship with the user to be loosely disconnected before the other side notices the disconnection.

Specifically, for example, as illustrated in FIG. 1, in a case where the user 2 wants to amicably disconnect the relationship with the user 1, the information processing system according to the present disclosure filters the number of posts of the user 2 displayed on a screen 130, which are viewed on the user 1 side, with passage of time. With the filtering, opportunities to see the posts of the user 2 decreases without the user 1 noticing the decrease, and the relationship with the user 2 on the social media is disconnected. Meanwhile, the user 2 side can amicably disconnect the relationship without letting the user 1 to notice the disconnection.

Next, an overall configuration of the information processing system according to the present embodiment will be described with reference to FIG. 2. FIG. 2 is a diagram illustrating an example of an overall configuration of the information processing system according to the present embodiment.

As illustrated in FIG. 2, the information processing system according to the present embodiment includes client terminals 1 (1a and 1b) of users and a server 2 that controls post filtering and the like. The client terminals 1 and the server 2 are connected via a network 3 (the Internet) and can transmit and receive data.

The client terminal 1 is an information processing terminal including an input unit and a display unit, such as a smartphone, a mobile phone terminal, a tablet terminal, a wearable device, a personal computer (PC), a game machine, or a music player. The user can use the social media developed on the Internet using the client terminal 1. In the present embodiment, a social media service in which interactive communication is performed by post data including at least one of images (a still image and a moving image), a text, or a sound is used as an example.

The server 2 is a social media server that executes such social media service.

Specific configurations of the devices included in the information processing system according to the present embodiment will be described next with reference to FIGS. 3 and 4.

2. BASIC CONFIGURATION AND OPERATION PROCESSING

<2-1. Configuration of Client Terminal 1>

Figure 3:
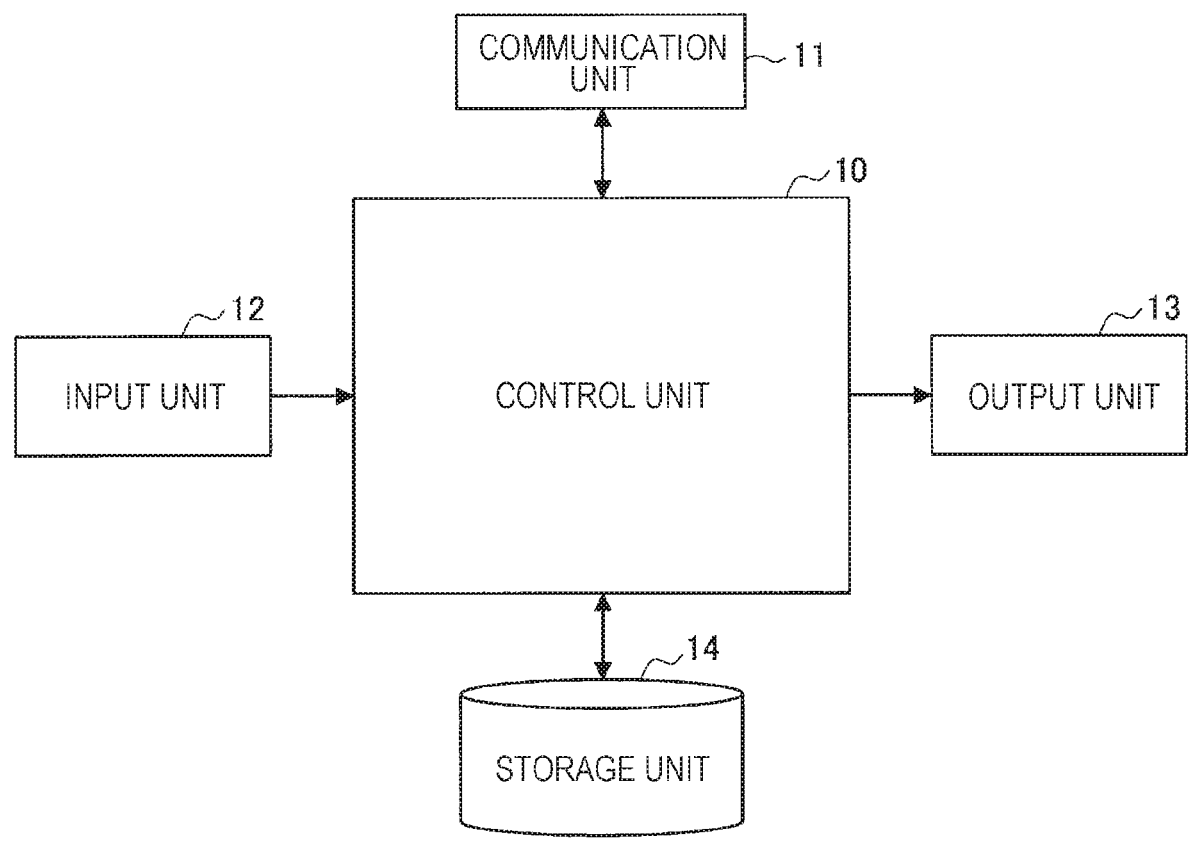
FIG. 3 is a block diagram illustrating an example of a configuration of a client terminal according to the present embodiment.

FIG. 3 is a block diagram illustrating an example of a configuration of the client terminal 1 according to the present embodiment. As illustrated in FIG. 3, the client terminal 1 includes a control unit 10, a communication unit 11, an input unit 12, an output unit 13, and a storage unit 14.

The control unit 10 functions as an arithmetic processing device and a control device, and controls overall operation in the client terminal 1 according to various programs. The control unit 10 is realized by, for example, a central processing unit (CPU) and an electronic circuit such as a microprocessor. Furthermore, the control unit 10 may include a read only memory (ROM) that stores programs and operation parameters to be used and a random access memory (RAM) that temporarily stores parameters that appropriately change, and the like.

Furthermore, the control unit 10 according to the present embodiment performs control to transmit information input by the input unit 12 to the server 2 (social media server) on the network via the communication unit 11, as post data according to user operation. Furthermore, the control unit 10 performs control to output, from the output unit 13, post data of the user and another user received from the server 2.

The communication unit 11 is connected to the network 3 by wire or wireless means and transmits or receives data to or from the server 2. The communication unit 11 is connected to and performs communication with the network 3 by, for example, a wired or wireless local area network (LAN), Wi-Fi (registered trademark), a mobile communication network (long term evolution (LTE)), or a third-generation mobile communication system (3G).

The input unit 12 is an interface that detects input information to the client terminal 1 and outputs the information to the control unit 10. For example, the input unit 12 may be an operation input unit, an audio input unit (microphone), or a camera. The operation input unit may be a touch sensor, a pressure sensor, or a proximity sensor integrally provided with a display screen (an example of the output unit 13) of the client terminal 1. Alternatively, the operation input unit may be a physical configuration such as a button, a switch, or a lever.

The output unit 13 can be realized by a display unit that outputs an image and a text, or an audio output unit (speaker) that outputs a sound. The display unit may be, for example, a display device such as a liquid crystal display (LCD) or an organic electroluminescence (EL) display.

The storage unit 14 is realized by a read only memory (ROM) that stores programs and operation parameters to be used for processing of the control unit 10 and a random access memory (RAM) that temporarily stores parameters that appropriately change, and the like.

The configuration of the client terminal 1 according to the present embodiment has been specifically described above. Note that the above-described configuration of the client terminal 1 is an example, and the present embodiment is not limited to the example.

<2-2. Configuration of Server 2>

Figure 4:
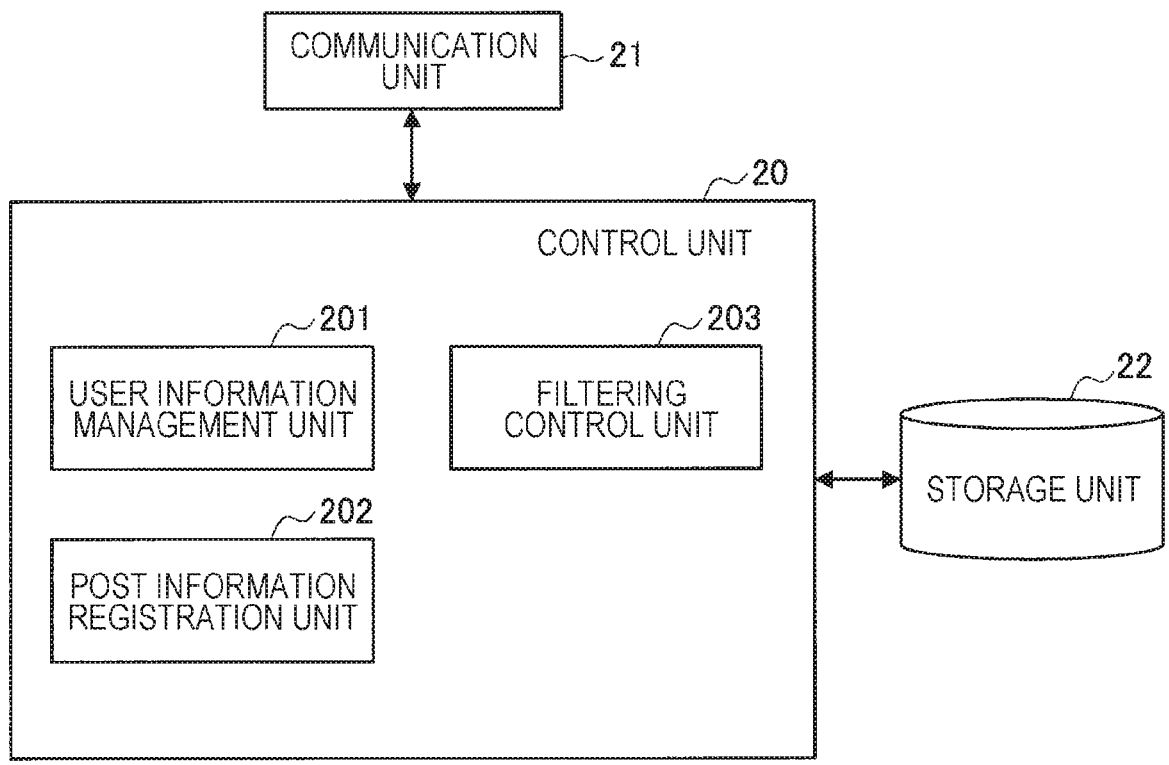
FIG. 4 is a block diagram illustrating an example of a configuration of a server according to the present embodiment.

FIG. 4 is a block diagram illustrating an example of a configuration of a server 2 according to the present embodiment. As illustrated in FIG. 4, the server 2 (information processing apparatus) includes a control unit 20, a communication unit 21, and a storage unit 22.

(Control Unit 20)

The control unit 20 functions as an arithmetic processing device and a control device, and controls overall operation in the server 2 according to various programs. The control unit 20 is realized by, for example, a central processing unit (CPU) and an electronic circuit such as a microprocessor. Furthermore, the control unit 20 may include a read only memory (ROM) that stores programs and operation parameters to be used and a random access memory (RAM) that temporarily stores parameters that appropriately change, and the like.

Furthermore, the control unit 20 according to the present embodiment also functions as a user information management unit 201, a posted information registration unit 202, and a filtering control unit 203.

The user information management unit 201 performs management (registration, update, deletion, and the like) of user information of social media users registered in the storage unit 22.

The posted information registration unit 202 registers posted information transmitted (posted) from the client terminal 1 of each user in the storage unit 22. Furthermore, the posted information registration unit 202 also registers, in the storage unit 22, response information (comment) to the posted information transmitted from the client terminal 1.

When transmitting display information including posted information of the user and other users in response to a display request from the client terminal 1 of each user, the filtering control unit 203 filters the posted information of other users to be included in the display information in consideration of relationship disconnection information of each user and the like stored in the storage unit 22. For example, in a case where relationship disconnection information of disconnecting the relationship between a first user and a second user is registered, the filtering control unit 203 filters the posted information of the first user to be included in the display information to be transmitted to the second user. At this time, the filtering control unit 203 calculates a display probability in consideration of an elapsed time from registration date and time of the relationship disconnection information, and determines displayability of each post of the first user (for each post), thereby gradually reducing the number of posts. Note that specific content of the filtering control according to the present embodiment will be described below using a plurality of embodiments.

(Communication Unit 21)

The communication unit 21 is connected to the network 3 by wire or wireless means and transmits or receives data to or from many client terminals 1. Furthermore, the communication unit 21 is connected to and performs communication with the network 3 by, for example, a wired/wireless local area network (LAN), or wireless fidelity (Wi-Fi, registered trademark).

(Storage Unit 22)

The storage unit 22 is realized by a ROM that stores programs and operation parameters to be used for processing of the control unit 20 and a RAM that temporarily stores parameters that appropriately change, and the like. For example, the storage unit 22 according to the present embodiment stores the user information, the posted information, the response information, and the relationship disconnection information described above. Data configuration examples of the pieces of information will be described in the embodiments as described below.

The configuration of the server 2 according to the present embodiment has been specifically described. Note that the configuration of the server 2 illustrated in FIG. 4 is an example, and the present embodiment is not limited to the example.

<2-3. Basic Operation Processing>

Figure 5:
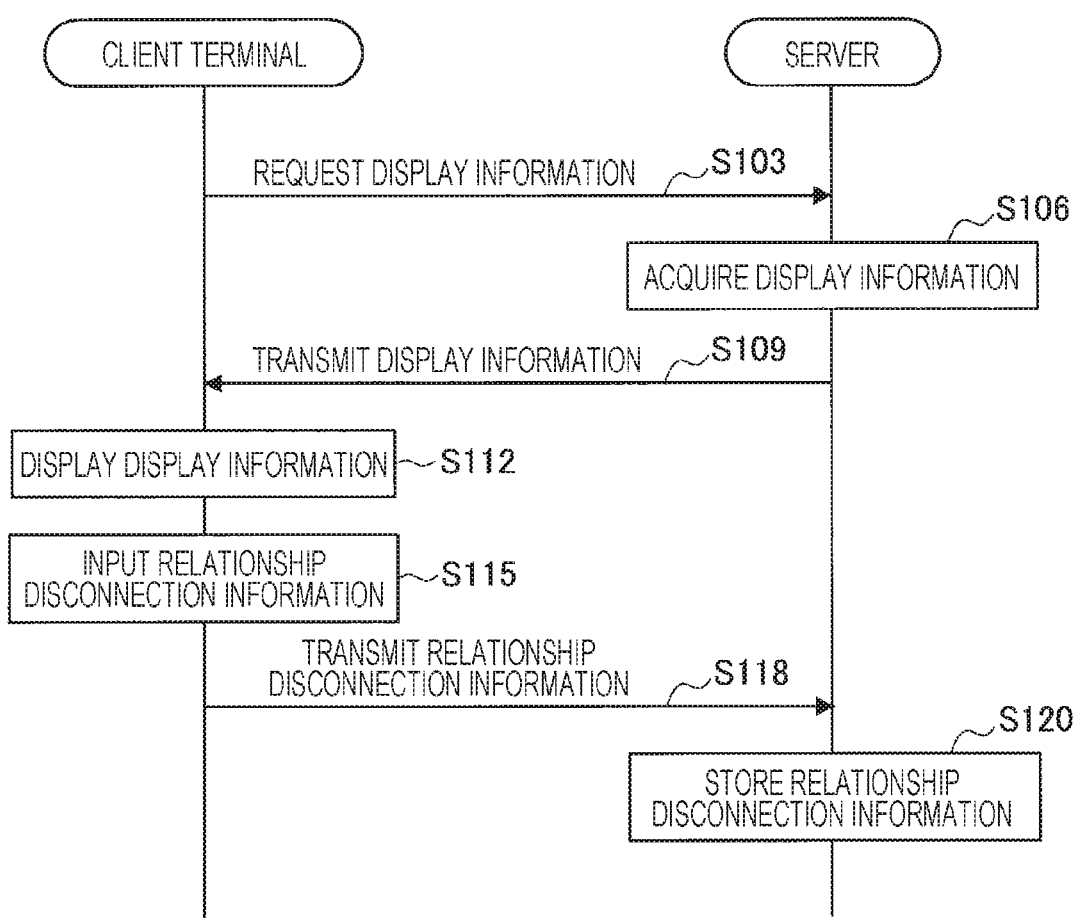
FIG. 5 is a sequence diagram illustrating basic operation processing of the information processing system according to the present embodiment.

Next, basic operation processing of the information processing system according to the present disclosure will be described with reference to FIG. 5. FIG. 5 is a sequence diagram illustrating basic operation processing of the information processing system according to the present embodiment.

As illustrated in FIG. 5, first, when the client terminal 1 makes a request for the display information to the server 2 (step S103), the server 2 performs display information acquisition processing (step S106). Specifically, the server 2 refers to the user information of the user and acquires the display information including the posted information of other users registered as friends. At this time, the server 2 can also refer to the relationship disconnection information and can filter the posted information of a predetermined another user (a user to which relationship disconnection with the user of the client terminal 1 is set) (loosely according to passage of time).

Next, the server 2 transmits the display information to the client terminal 1 (step S109), and the display information is displayed on the client terminal 1 (step S112). With the display, the user can see the posted information of other users. Such processing is similarly performed on a friend side, and interactive communication (connection by the social media) is realized through the posted information.

Furthermore, in a case where the user wants to disconnect the relationship with the other side registered as a friend, the user inputs the relationship disconnection information in the client terminal 1 (step S115).

Next, the client terminal 1 transmits the input relationship disconnection information to the server 2 (step S115).

Next, the server 2 stores the relationship disconnection information (step S120). The stored relationship disconnection information is referred to in the filtering of the posted information when acquiring the display information in response to the display request from the client terminal 1, as described above, and loose relationship disconnection with the registered friend is realized.

3. EMBODIMENTS

Next, the information processing system according to the present embodiment will be specifically described using a plurality of embodiments.

3-1. First Embodiment

First, in a first embodiment, relationship disconnection information registration processing and filtering processing using the registered relationship disconnection information will be specifically described with reference to FIGS. 6 to 11.

(3-1-1. Relationship Disconnection Information Registration Processing)

In setting relationship disconnection with a friend on the social media, the user selects a friend with which the user wants to disconnect the relationship from a friend list (a list of friend information) displayed on the output unit 13 of the client terminal 1. Here, a flowchart illustrating friend information display processing will be described in FIG. 6.

Figure 6:
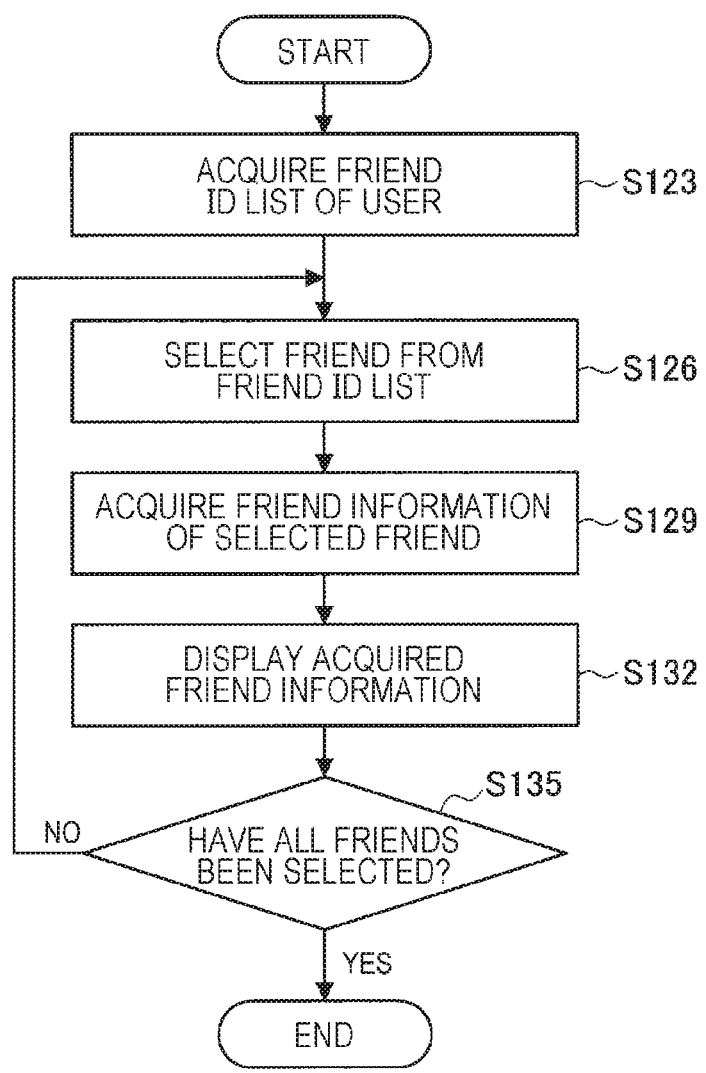
FIG. 6 is a flowchart illustrating friend information display processing according to a first embodiment.

As illustrated in FIG. 6, first, the user information management unit 201 of the server 2 acquires a friend ID list of the user from the user information of the user stored in the storage unit 22 in response to the display request of the friend information from the client terminal 1 of the user (step S123). In a data configuration of the user information, a user name, the friend ID list, a post ID list, a response ID list, and a relationship disconnection ID list (disconnection candidate user information) are registered for each user ID, as illustrated in Table 1 below, for example. The friend ID list is an ID list of other users registered as friends of the user. The post ID list is an ID list of the posted information posted by the user. The response ID list is an ID list of the response information posted by the user. The relationship disconnection ID list is an ID list of the relationship disconnection information registered by the user.

TABLE 1

| User ID | User name | Friend ID list | Post ID list | Response ID list | Relationship disconnection ID list |
|---|---|---|---|---|---|
| U1 | AAAA | [U2, U24] | [P7, P32, P58] | [R1] | [ ] |
| U2 | BBBB | [U1, U52] | [P2, P13] | [R5, R37] | [U1: C1, U42: C13] |
| ... | ... | ... | ... | ... | ... |

Next, the user information management unit 201 selects a friend from the friend ID list (step S126), and acquires the friend information of the selected friend (that is, the friend information associated with the selected friend ID) from the storage unit 22 (step S129). The friend information includes, for example, an icon image and profile information.

Next, the control unit 20 of the server 2 displays the acquired friend information on the client terminal 1 (step S132). Specifically, the control unit 20 transmits the acquired friend information to the client terminal 1.

The above-described processing in steps S126 to S132 is repeated until all of friends are selected from the friend ID list (step S135).

Thereby, a list of the friend information is displayed on the client terminal 1 of the user.

Figure 7:
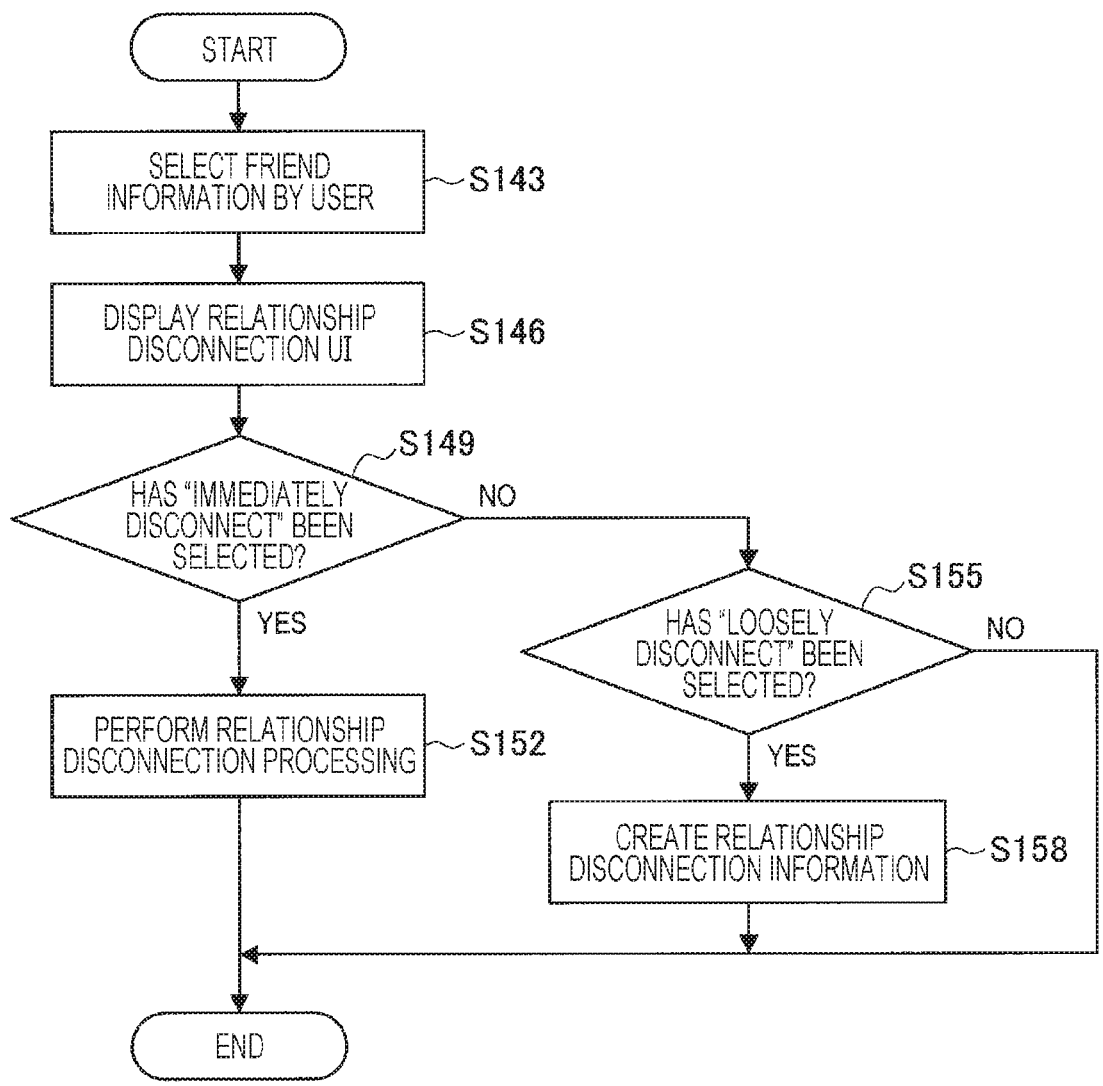
FIG. 7 is a flowchart illustrating relationship disconnection information registration processing according to the first embodiment.

Next, the relationship disconnection information registration processing will be described with reference to FIG. 7. FIG. 7 is a flowchart illustrating registration processing of the relationship disconnection information (setting information specifying a filtering method (a graph type for calculating display probability)) according to the present embodiment.

Figure 8:
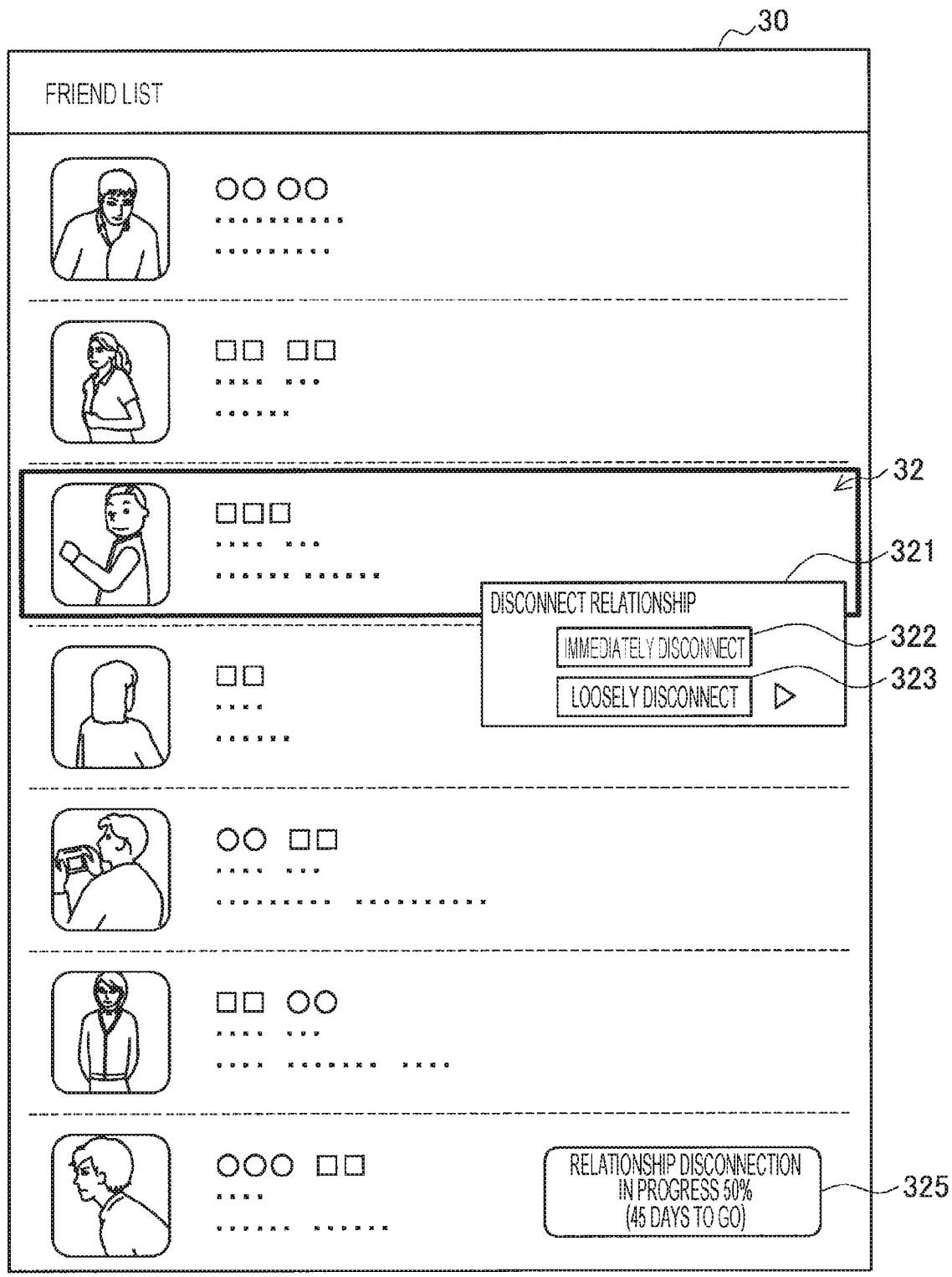
FIG. 8 is a view illustrating an example of a relationship disconnection user interface (UI) according to the first embodiment.

As illustrated in FIG. 7, first, when target friend information is selected by the user from the list of the friend information displayed on the client terminal 1 (step S143), the control unit 20 of the server 2 displays a relationship disconnection UI for setting relationship disconnection with the selected friend (step S146). Here, FIG. 8 illustrates an example of the relationship disconnection UI according to the present embodiment. A screen 30 illustrated in FIG. 8 is an example of a list screen of the friend information displayed on the output unit 13 of the client terminal 1, and the icon images and the profile information such as names of the friends connected with the user are displayed. When the user selects a display region 32 of the friend with which the user wants to disconnect the relationship, a relationship disconnection UI 321 is displayed, as illustrated in FIG. 8. The relationship disconnection UI 321 includes an "immediately disconnect" button 322 and a "loosely disconnect" button 323. Note that a menu screen may be displayed when the display region 32 of the friend is selected, and the relationship disconnection UI 321 as illustrated in FIG. 8 may be displayed in a case where "disconnect relationship" is selected from the menu screen. Furthermore, a relationship disconnection in progress display 325 is displayed in a display column of a friend with which the relationship disconnection is already in progress, as illustrated in FIG. 8. A progress status of the relationship disconnection is displayed in the relationship disconnection in progress display 325, for example.

Next, in a case where the "immediately disconnect" button 322 has been selected in the relationship disconnection UI 321 (step S149/Yes), the user information management unit 201 of the server 2 performs normal relationship disconnection processing (step S152). Specifically, the user information management unit 201 deletes the ID of the other side with which the relationship is to be disconnected from the "friend ID list" included in the user information of the user stored in the storage unit 22 and also deletes the ID of the user from the friend ID list of the relationship disconnection side. While such relationship disconnection processing has an effect of quick execution of the relationship disconnection, the user's post suddenly disappears on the other side and thus the other side may notice the disconnection of the relationship.

Meanwhile, in a case where the "loosely disconnect" button 323 has been selected in the relationship disconnection UI 321 (step S155/Yes), the filtering control unit 203 of the server 2 creates relationship disconnection information for filtering posts (step S158). Note that the "loosely disconnect" has options, and the user can specify a period to finally delete posts and the graph type of the display probability used in filtering posts. Here, FIG. 9 illustrates an example of a relationship disconnection option UI.

Figure 9:
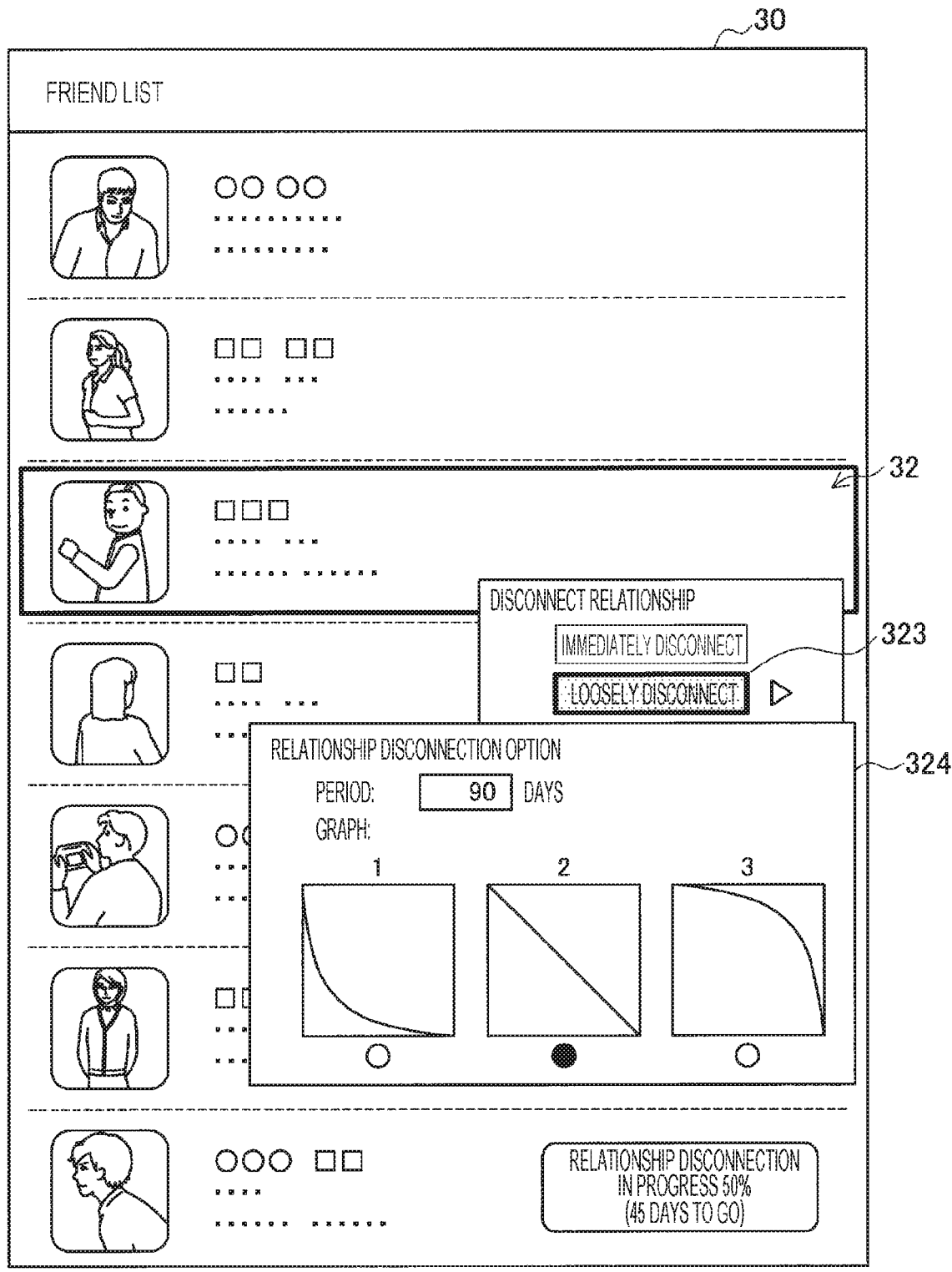
FIG. 9 is a view illustrating an example of a relationship disconnection option UI according to the first embodiment.

As illustrated in FIG. 9, when "loosely disconnect" button 323 is selected, a relationship disconnection option UI 324 is displayed. In the relationship disconnection option UI 324, the period to finally disconnect relationship and the graph type of the display probability used in the filtering posts for realizing loose disconnection can be specified. The horizontal axis in each graph represents time (elapsed time from when the relationship disconnection information is registered) and the right end represents a specified period, and the vertical axis represents the display probability (0 to 1, for example) of posts in the filtering processing.

The filtering control unit 203 creates a new relationship disconnection ID, and stores current date and time, a relationship disconnector ID (the user ID of the user), a relationship disconnected user ID (the user ID of the other side with which disconnection is desired), a state ("disconnection in progress"), and the specified period and graph type in association with one another as relationship disconnection information in the storage unit 22. Here, an example of a data configuration of the relationship disconnection information will be illustrated in Table 2 below. "State: restoration in progress" in Table 2 below will be described below with reference to FIGS. 12 and 13.

TABLE 2

| Relationship disconnection ID | Date and time | Relationship disconnector ID | Relationship disconnected user ID | State | Period | Graph type |
|---|---|---|---|---|---|---|
| C1 | 2016 Aug. 30 8:12 | U2 | U1 | Disconnection in progress | 90 | Graph 1 |
| C2 | 2016 Nov. 6 22:17 | U8 | U61 | Restoration in progress | 30 | Graph 2 |
| ... | ... | ... | ... | ... | ... | ... |

Furthermore, the filtering control unit 203 adds a pair of the user ID of the other side with which disconnection is desired and the corresponding relationship disconnection ID to the relationship disconnection ID list (see Table 1 above) included in the user information of the user, in addition to the creation of the relationship disconnection information.

The relationship disconnection information registration processing has been specifically described.

(3-1-2. Filtering Processing)

Next, the filtering processing using the relationship disconnection information will be described with reference to FIGS. 10 and 11.

Figure 10:
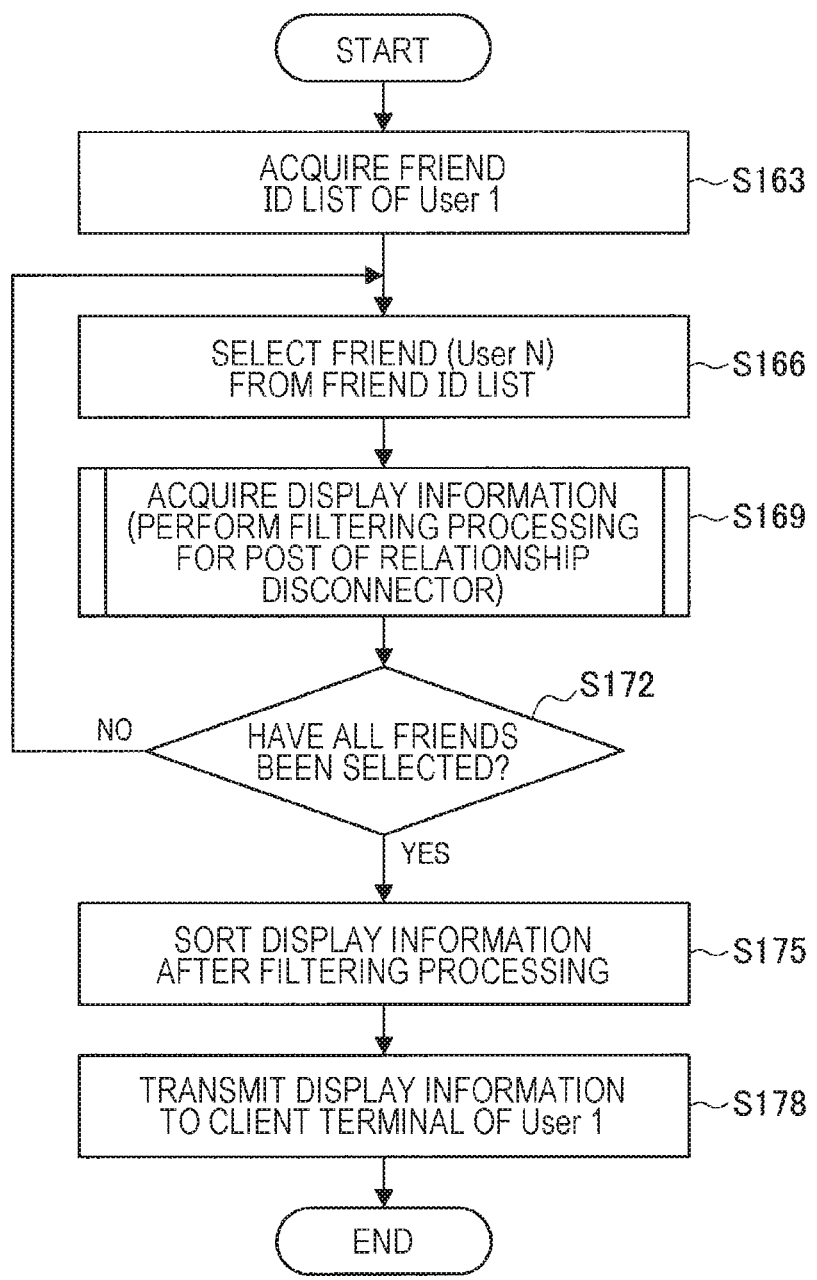
FIG. 10 is a flowchart illustrating display information acquisition processing according to the first embodiment.

FIG. 10 is a flowchart illustrating the display information acquisition processing according to the present embodiment. Here, display information acquisition processing by the server 2 in a case where a request (see FIG. 5) of the display information has been given from the client terminal 1 of the first user (hereinafter referred to as "User 1") will be described as an example.

First, as illustrated in FIG. 10, the control unit 20 of the server 2 acquires the friend ID list of User 1 (step S163) and selects a friend (hereinafter referred to as "User N") from the friend ID list (step S166). The selection method is not particularly limited, and for example, a user who has made a latest post may be selected with reference to the posted information or a user may be selected in order of registration.

Next, the control unit 20 acquires the posted information of User N as the display information (step S169). At this time, the control unit 20 causes the filtering control unit 203 to perform the filtering processing, and restricts posting of User N (posting of the relationship disconnector) in a case where User N registers the relationship disconnection information to disconnect the relationship with User 1 (in other words, here, User N is the relationship disconnector and User 1 is the relationship disconnected user). With the restriction, User N can loosely disconnect the relationship with User 1 without allowing User 1 to notice the disconnection. Such filtering processing will be described in detail with reference to FIG. 11.

The processing in steps S166 and S169 are repeated until all the friends included in the friend ID list are selected (step S172).

Then, the control unit 20 sorts the display information after the filtering processing (for example, arranging the display information in order of posted date and time) and transmits the sorted display information to the client terminal 1 of User 1 (step S178). Note that the control unit 20 may transmit a predetermined display amount (ten pieces of posted information, for example), of the sorted display information, to the client terminal 1 and may transmit the next display information (next ten pieces) in a case where an operation to further read information is given from the client terminal 1.

Next, the filtering processing will be described with reference to FIG. 11. FIG. 11 is a flowchart illustrating filtering processing according to the present embodiment.

Figure 11:
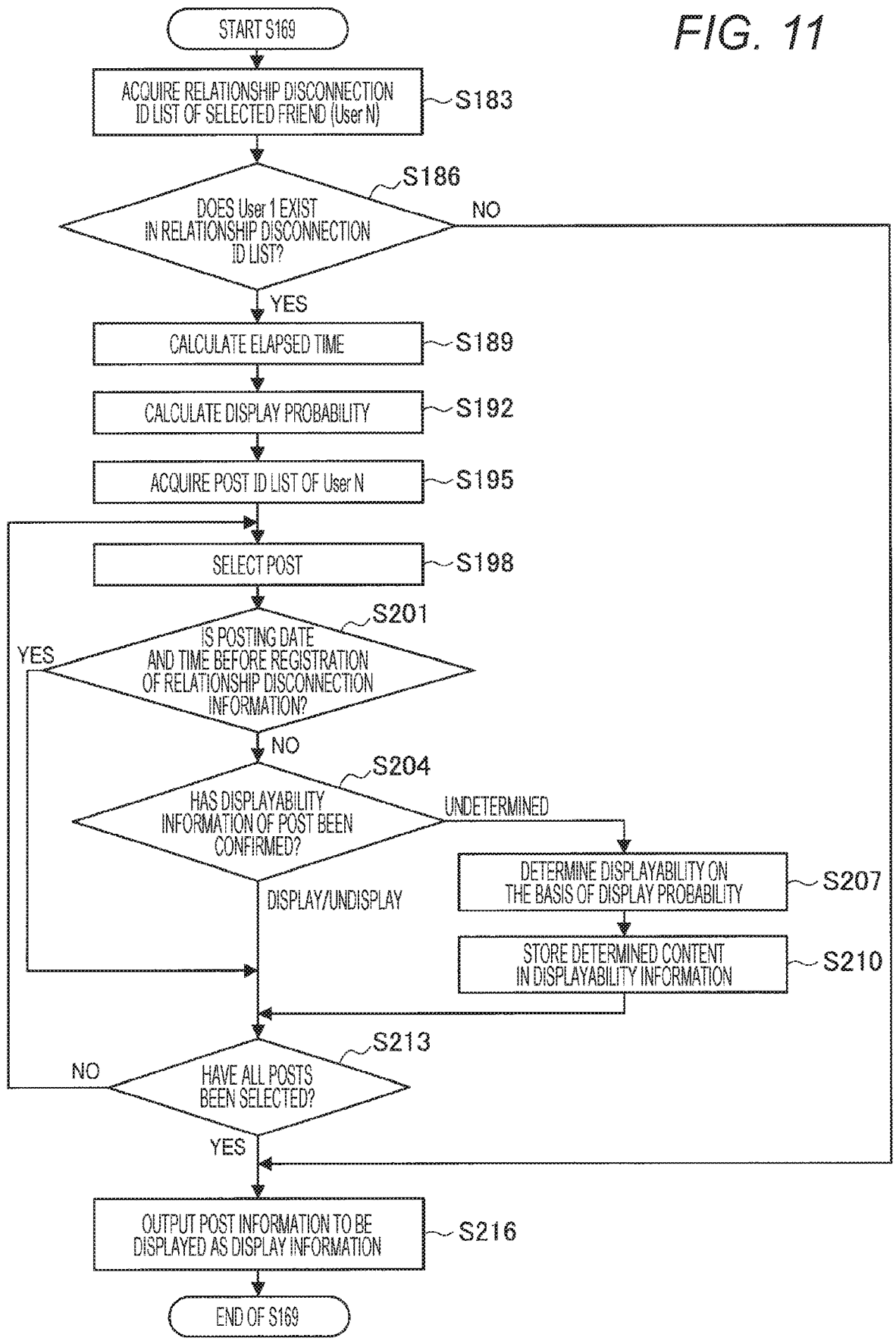
FIG. 11 is a flowchart illustrating filtering processing according to the first embodiment.

First, as illustrated in FIG. 11, the filtering control unit 203 acquires the relationship disconnection ID list of the selected friend (User N) from the user information (see Table 1 above) stored in the storage unit 22 (step S183). In the relationship disconnection ID list, the user ID of the other side with which User N wants to disconnect the relationship and the corresponding relationship disconnection ID are registered in pair.

Next, in a case where User 1 exists in the relationship disconnection ID list (step S186/Yes), the filtering control unit 203 extracts the relationship disconnection ID paired with the ID of User 1 from the relationship disconnection ID list, calculates an elapsed time from registration date and time of the relationship disconnection information to the present by reference to the relationship disconnection information (see Table 2 above) corresponding to the extracted relationship disconnection ID (step S189), and calculates the display probability at present by reference to the specified graph type (step S192).

Next, the filtering control unit 203 acquires the post ID list (see Table 1 above) from the user information of User N (step S195). At this time, for example, the filtering control unit 203 may acquire a predetermined number of posts such as ten posts from the latest posts and may further acquire the next predetermined number of posts in a case where an instruction to further read posts is given from the client terminal 1 side.

Next, the filtering control unit 203 selects a post from the post ID list (step S198), refers to the corresponding posted information, and determines whether or not the posted date and time of the posted information is before the registration of the relationship disconnection information (step S201). Here, an example of the posted information stored in the storage unit 22 will be described in Table 3 below. As the posted information, the posted date and time, a poster ID, posted content, a response ID list, and displayability information are registered for each post ID.

TABLE 3

| Post ID | Posting date and time | Poster ID | Posted content | Response ID list | Displayability Information |
|---|---|---|---|---|---|
| P1 | 2016 Feb. 4 13:55 | U46 | I made Thai curry. | [R67] | [ ] |
| P2 | 2016 Jul. 7 14:32 | U2 | I climbed Mt. Fuji yesterday. | [R1] | [01: 0, U52: 1] |
| ... | ... | ... | ... | ... | ... |

In a case where the posted date and time is before the registration of the relationship disconnection information, there is a possibility that the posted information has been already viewed by the other side with which disconnection is desired, and if the posted information, which has been able to be viewed before, becomes no longer viewed, the relationship disconnection may be noticed by the other side. Therefore, in the present embodiment, the posted information posted before the registration of the relationship disconnection information is excluded from a target to be filtered. Note that the exclusion processing is an example, and the exclusion process may not be performed. Whether or not to perform the exclusion process may be set by the user as an option of the relationship disconnection UI.

Next, in a case where the posted date and time is not before the registration of the relationship disconnection information (in other words, after the registration) (step S201/Yes), the filtering control unit 203 confirms the "displayability information" included in the posted information (see Table 3) (step S204). The displayability information is information indicating a state of displayability to the disconnection side. For example, the above Table 3 shows that the posted information of the post ID: P2 is already in a non-display state for a disconnection side U1 but the posted information is in a display state for a disconnection side U52.

Next, in a case where displayability has not been determined (step S204/undetermined), the filtering control unit 203 determines the displayability of the posted information on the basis of the above referred display probability (step S207).

Next, the filtering control unit 203 stores determined content in the displayability information of the posted information (step S210).

The processing in steps S198 to S210 is repeated until all the acquired posts are selected (step S213).

Then, in a case where all the posts have been selected and the above processing has been performed (step S213/Yes), the filtering control unit 203 outputs the posted information to be displayed as the display information (step S216). In other words, in a case where the ID of User 1 does not exist in the relationship disconnection ID list of User N (step S186/No), the filtering control unit 203 does not need to perform filtering of relationship disconnection and thus outputs all the post (or a predetermined number of latest posts) in the post ID list of User N as the display information. On the other hand, in a case where the ID of User 1 exists in the relationship disconnection ID list of User N, the filtering control unit 203 performs filtering of relationship disconnection, and outputs the posted information that is displayable in the displayability information and the posted information posted before the registration of the relationship disconnection information as the display information.

Determination of the displayability is performed on the basis of the display probability calculated according to passage of time from the registration of the relationship disconnection information as described above, whereby the number of non-displayed posts is gradually increased with the passage of time, and the relationship can be finally disconnected.

(3-1-3. Relationship Restoration Processing)

The processing of disconnecting the relationship has been described. However, in the present embodiment, setting of relationship disconnection can be canceled (in other words, relationship restoration can be performed). Hereinafter, description will be given with reference to FIGS. 12 to 14.

Figure 12:
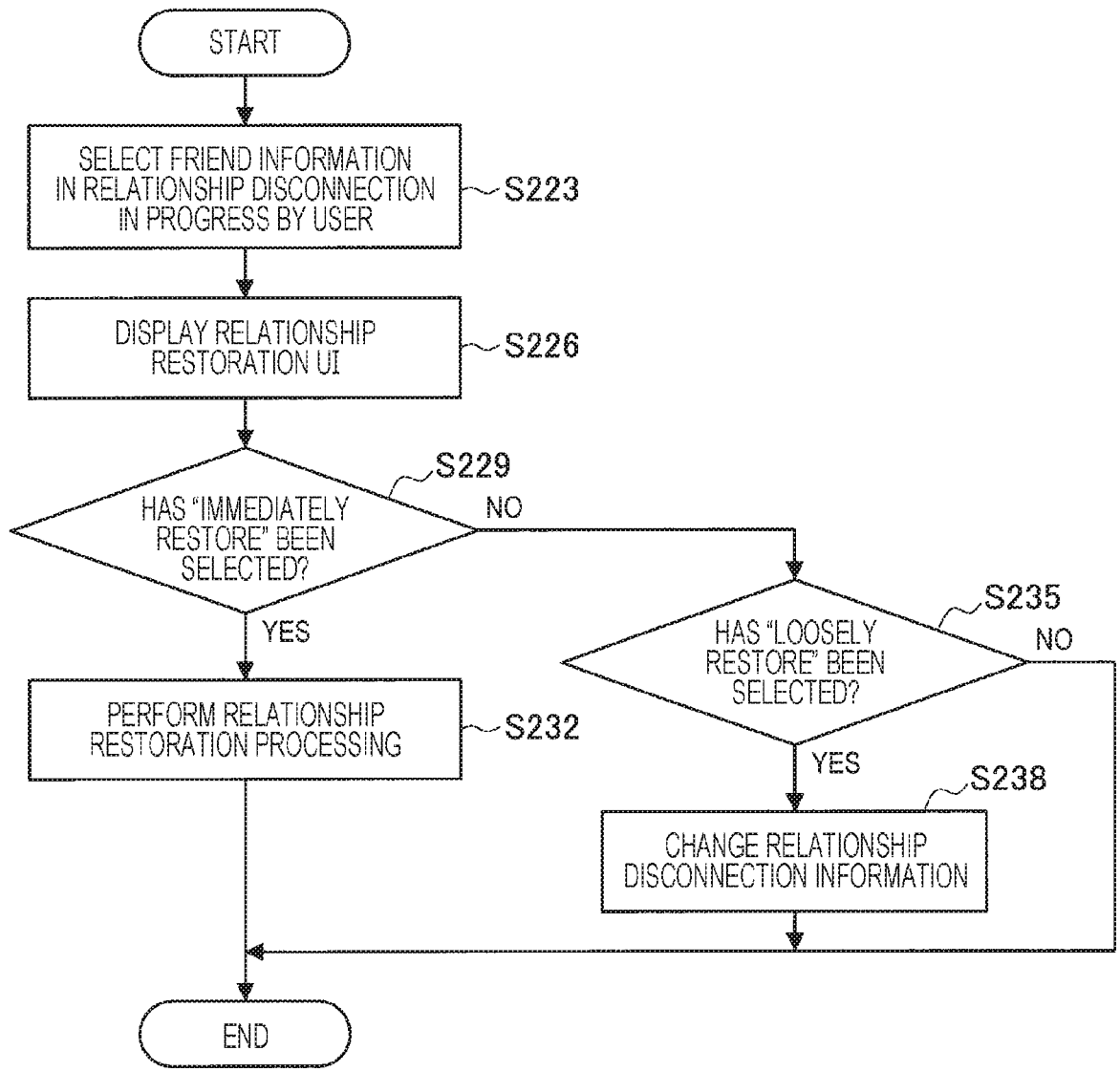
FIG. 12 is a flowchart illustrating relationship restoration processing according to the first embodiment.
Figure 13:
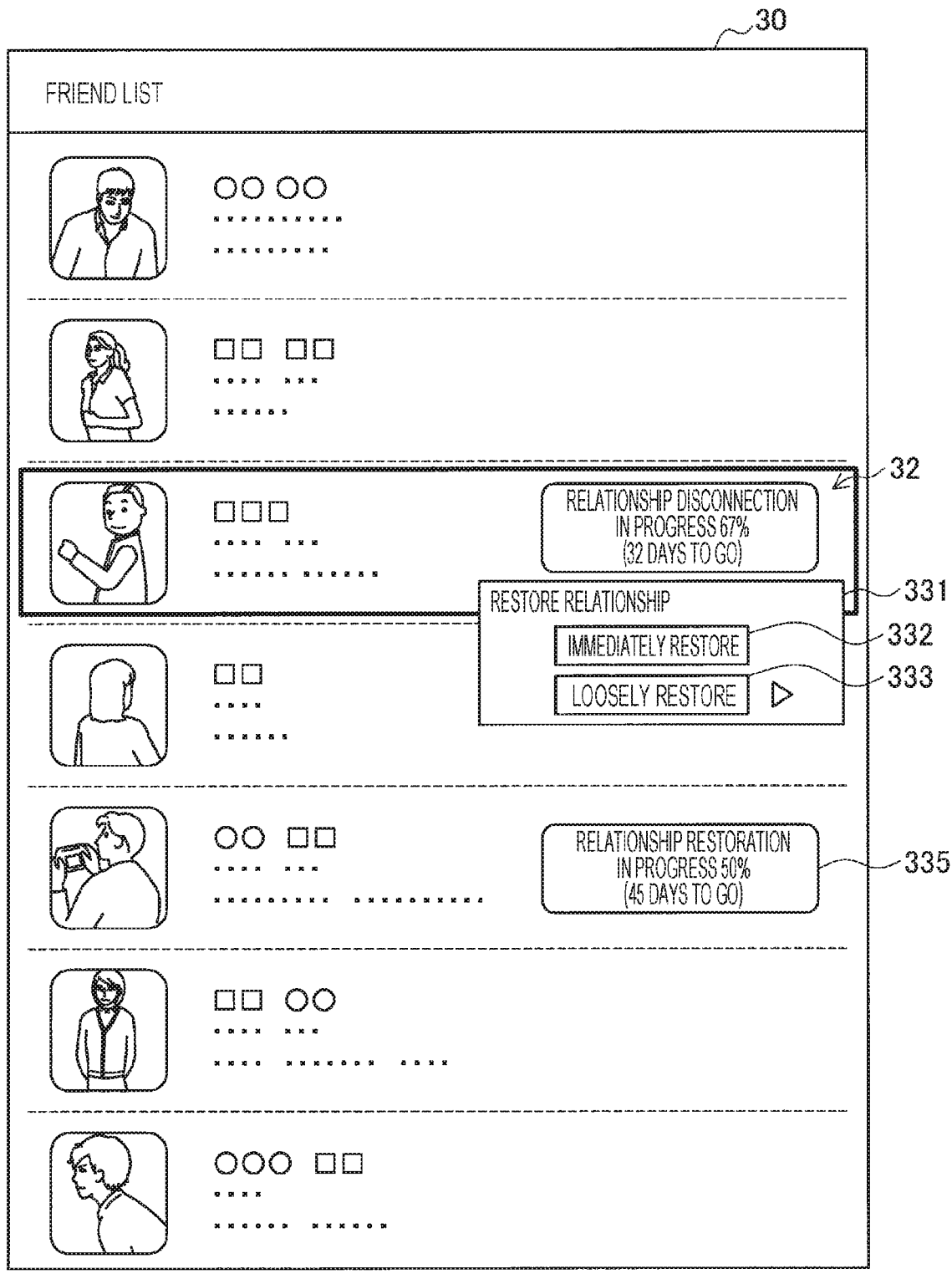
FIG. 13 is a view illustrating an example of a relationship restoration UI according to the first embodiment.

FIG. 12 is a flowchart illustrating relationship restoration processing according to the present embodiment. As illustrated in FIG. 12, first, when the friend information in relationship disconnection in progress by the user is selected in the client terminal 1 (step S223), the server 2 displays a relationship restoration UI for setting relationship restoration with the friend on the client terminal 1 (step S226). Here, an example of the relationship restoration UI is illustrated in FIG. 13. As illustrated in FIG. 13, when the display region 32 of the friend for which relationship disconnection in progress is displayed is selected on the screen 30 displaying a list of the friend information, a relationship restoration UI 331 is displayed. The relationship restoration UI 331 includes a "immediately restore" button 332 and a "loosely restore" button 333. Note that a menu screen may be displayed when the display region 32 of the friend is selected, and the relationship restoration UI 331 as illustrated in FIG. 13 may be display in a case where "restore relationship" is selected from the menu screen. Furthermore, a relationship restoration in progress display 335 is displayed in a display column of a friend with which relationship restoration is already in progress, as illustrated in FIG. 13. A progress status of the relationship restoration is displayed in the relationship restoration in progress display 335, for example.

Next, in a case where the "immediately restore" button 332 has been selected in the relationship restoration UI 331 (step S229/Yes), the user information management unit 201 of the server 2 performs the relationship restoration processing (step S232). Specifically, the user information management unit 201 deletes the pair of the ID of the other side to be restored and the corresponding relationship disconnection ID from the "relationship disconnection ID list" included in the user information of the user stored in the storage unit 22, and deletes the relationship disconnection ID from the relationship disconnection information. While such relationship restoration processing has an effect of quick execution of the relationship restoration, the user's post suddenly appears on the other side and thus the other side may notice the relationship was tried to be disconnected.

Meanwhile, in a case where the "loosely restore" button 333 has been selected in the relationship restoration UI 331 (step S235/Yes), the filtering control unit 203 of the server 2 changes the relationship disconnection information (step S238). Note that the "loosely restore" has options, and the user can specify a period to finally restore the relationship and the graph type of the display probability used in filtering posts. Here, an example of the relationship restoration option UI will be described in FIG. 14.

Figure 14:
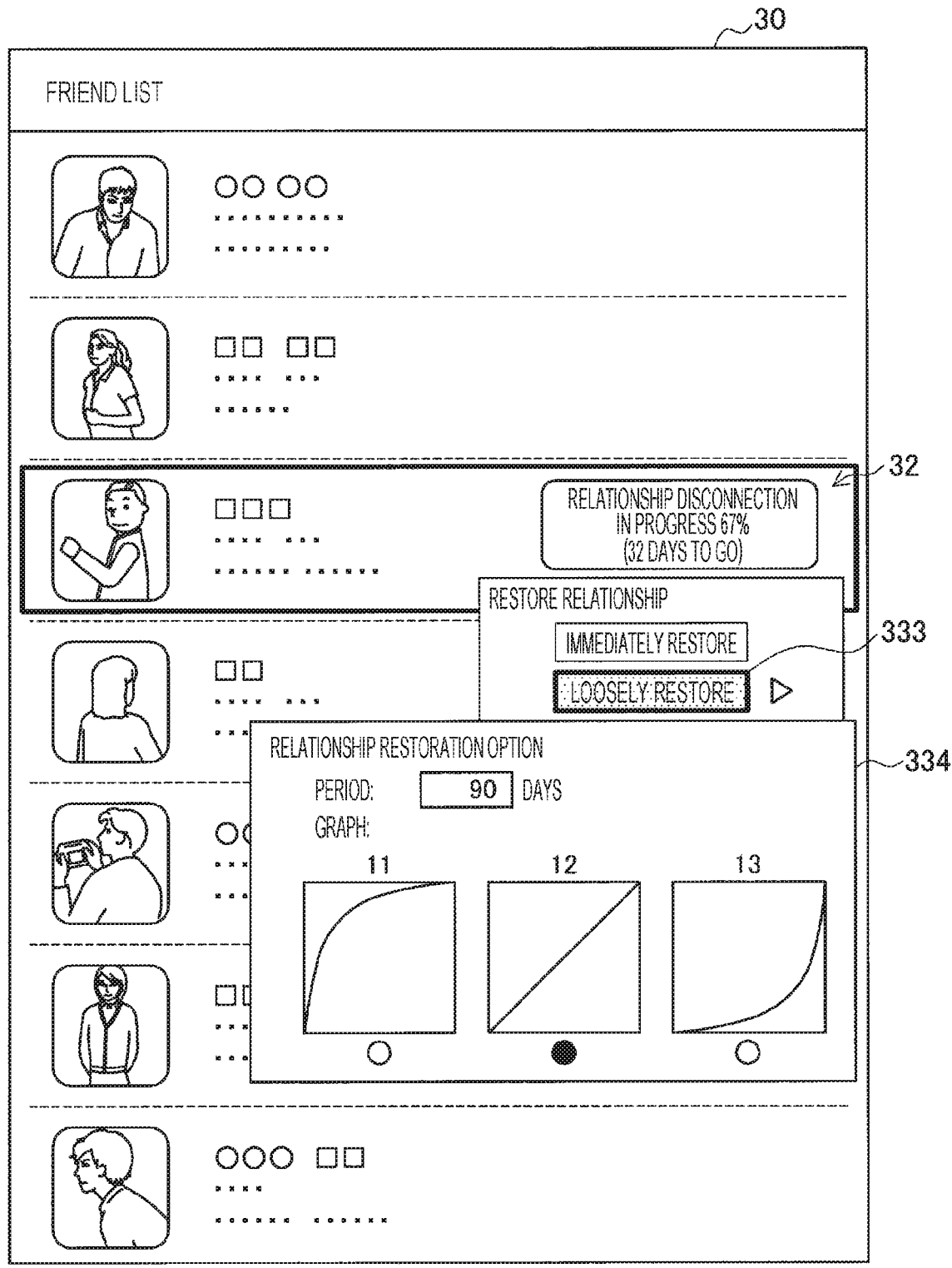
FIG. 14 is a view illustrating an example of a relationship restoration option UI according to the first embodiment.

As illustrated in FIG. 14, when the "loosely restore" button 333" is selected, a relationship restoration option UI 334 is displayed. In the relationship restoration option UI 334, the period to finally restore the relationship and the graph type of the display probability used in the filtering posts for realizing loose restoration can be specified. The horizontal axis in each graph represents time (elapsed time from when the relationship restoration is registered) and the right end represents a specified period, and the vertical axis represents the display probability (0 to 1, for example) of posts in the filtering processing.

The filtering control unit 203 deletes the current information of the relationship disconnection ID, creates a new relationship disconnection (restoration) ID, and stores, in the storage unit 22, the current date and time, a disconnection restorer ID (the user ID of the user), a disconnection restored user ID (the user ID of the other side with which restoration of disconnection is desired), a state ("restoration in progress"), and the specified period and graph type in association with one another as relationship disconnection (restoration) information (see the relationship disconnection ID: C2 in Table 2 above). Alternatively, the filtering control unit 203 may correct the current information of the relationship disconnection ID to be the above relationship disconnection (restoration) information.

The display information acquisition processing and the filtering processing at the time of relationship restoration are similar to FIGS. 10 and 11 above. The number of displayed posts gradually increases as the display probability referred to in the filtering processing gradually rises, and the relationship is restored. Note that whether or not to recover all the past posts (whether or not to display the past posts flagged not to be displayed in the displayability) when the number of relationship restorations reaches 100% may be made selectable by the user.

(3-1-4. Final Disconnection Processing)

Next, a case of confirming to the user whether or not to perform final disconnection processing of deleting the friend ID from the friend list in a case where the loosely disconnecting processing is terminated will be described with reference to FIGS. 15 to 17.

Figure 15:
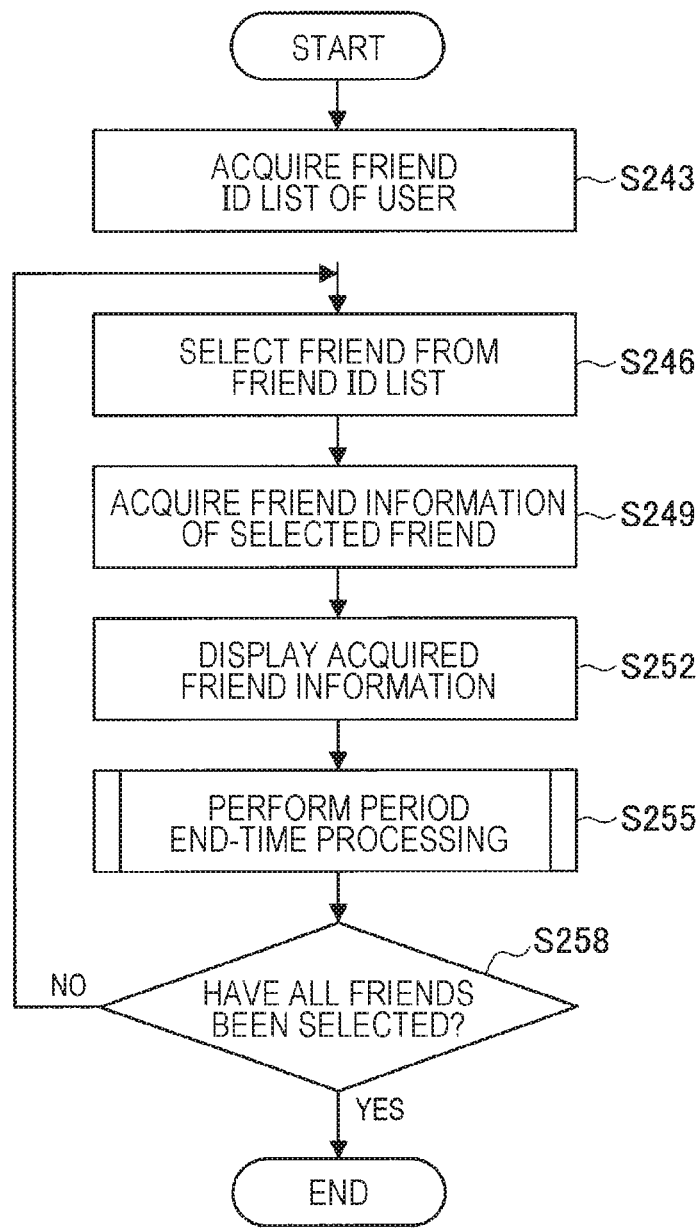
FIG. 15 is a flowchart illustrating friend information display processing according to the first embodiment.

FIG. 15 is a flowchart illustrating friend information display processing according to the present embodiment. As illustrated in FIG. 15, first, the user information management unit 201 of the server 2 acquires the friend ID list of the user in response to the friend information display request from the client terminal 1 (step S243) and selects a friend (step S246).

Next, the friend information of the selected friend is displayed on the client terminal 1 (step S252).

Next, the user information management unit 201 performs period end-time processing with reference to the relationship disconnection information of the user (step S255). Specific content of the period end-time processing will be described below with reference to FIG. 16.

Then, the processing in steps S246 to S255 is repeated until all friends are selected (step S258).

(Period-End Time Processing)

Figure 16:
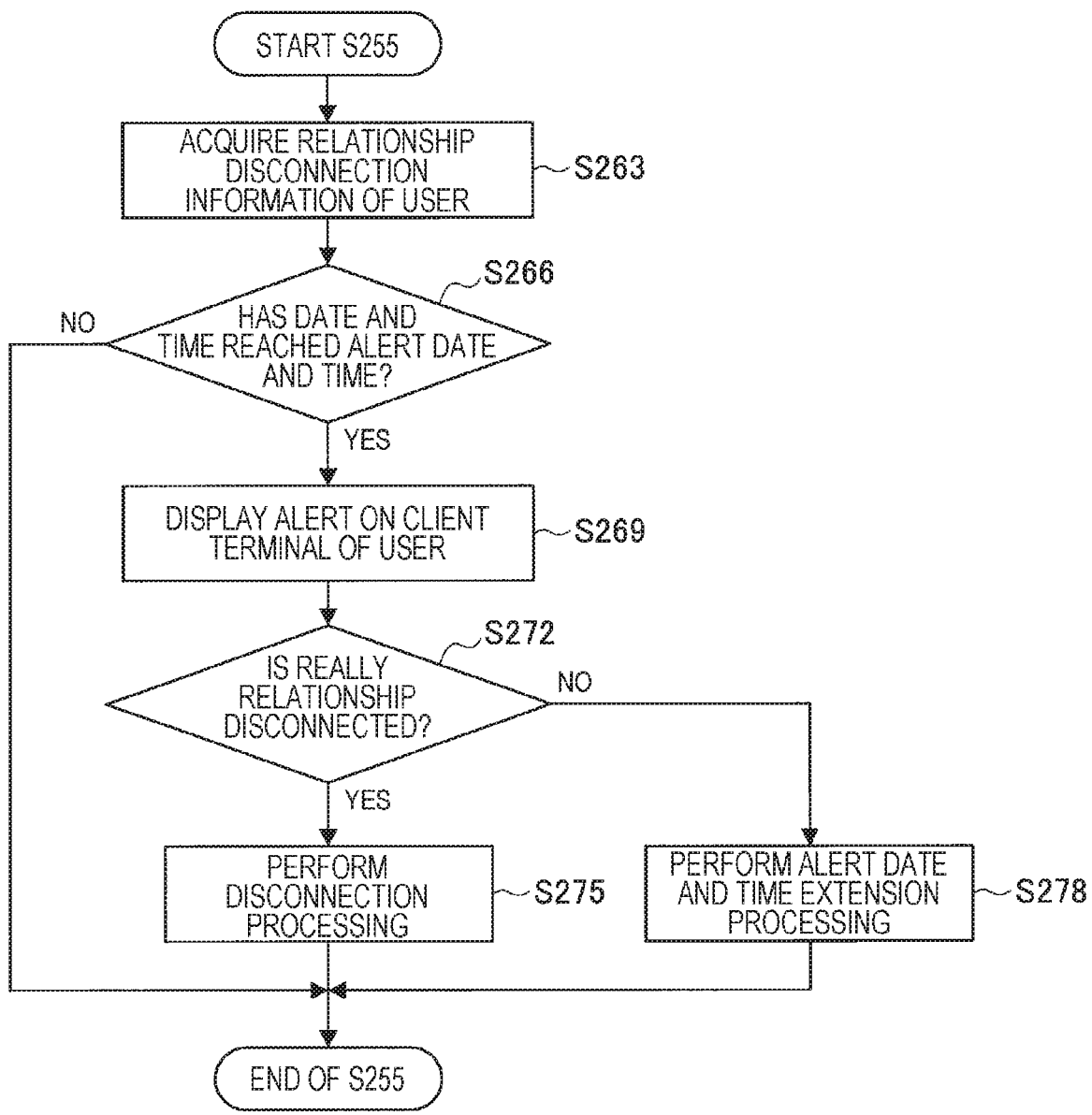
FIG. 16 is a flowchart illustrating period end-time processing according to the first embodiment.
Figure 17:
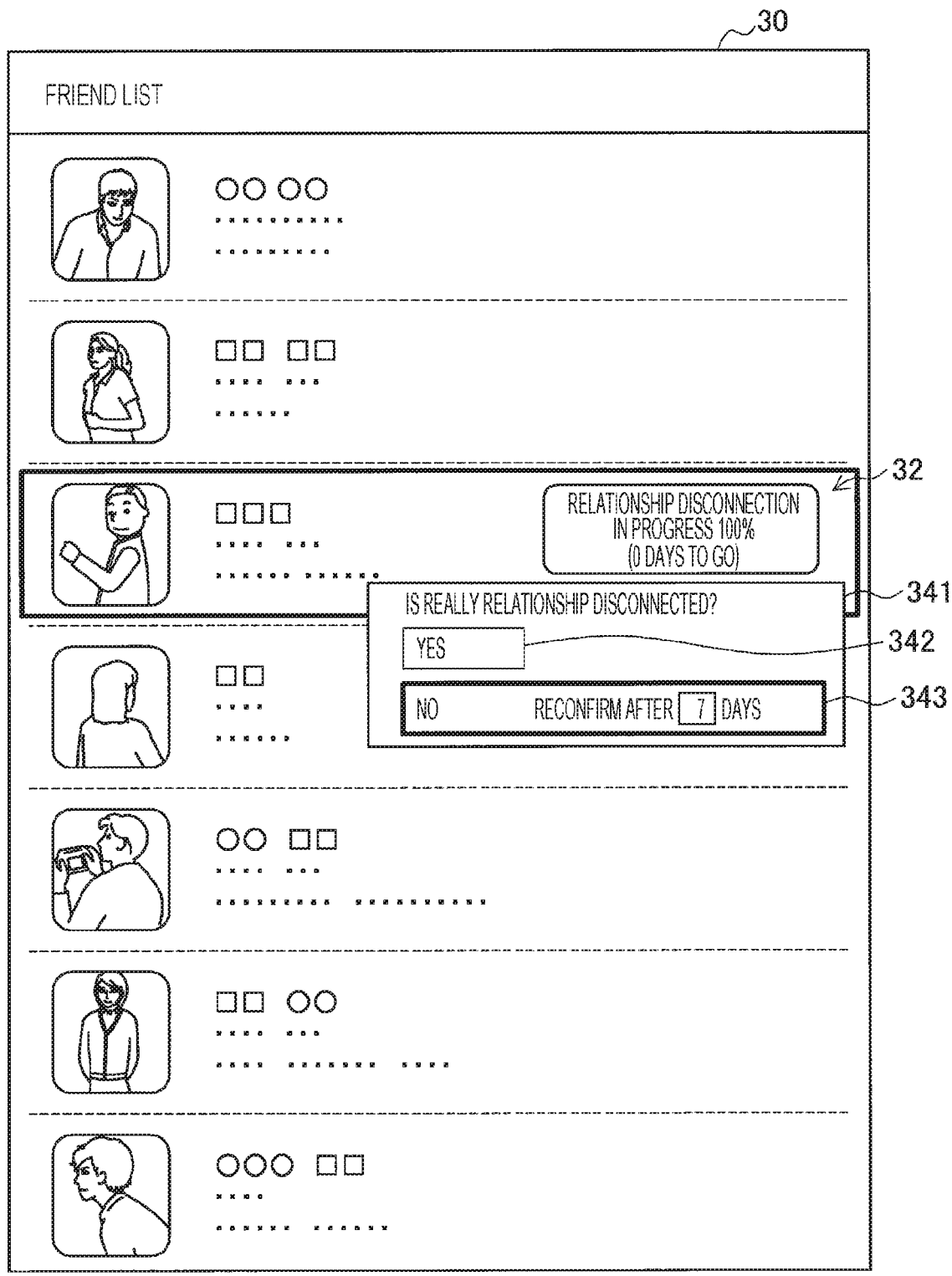
FIG. 17 is a view illustrating an example of a relationship disconnection final confirmation UI according to the first embodiment.

FIG. 16 is a flowchart illustrating the period end-time processing according to the present embodiment. As illustrated in FIG. 16, first, the user information management unit 201 of the server 2 acquires the relationship disconnection information registered by the user from the storage unit 22 (step S263). Here, a data configuration example of the relationship disconnection information in a case of performing the final disconnection processing will be illustrated in Table 4 below. Here, an alert date and time item for confirming final disconnection to the user is newly added. The alert date and time may be automatically set or may be specified by the user in the relationship disconnection UI. Furthermore, the alert of restoration in progress is used as a notification alert for confirming, to the user, whether or not to display all the filtered posts in a case where all the posts are 100% recovered as described above, for example.

may be specified by the user in the relationship disconnection confirmation UI 341 or may be automatically determined.

3-2. Second Embodiment

Next, a second embodiment will be described with reference to FIGS. 18 to 20. In the second embodiment, when filtering processing is performed, a category based on content of user's posted information is referred to, and a post of the category that matches an interest of the other side with which disconnection is desired is preferentially filtered, whereby a probability of displaying high-interest posts of the other side can be reduced. As a result, in a loose disconnection process, a display probability of low-interest posts of the other side is increased. Therefore, an interest from the other side is not drawn, and the relationship can be

TABLE 4

| Relationship disconnection ID | Date and time | Relationship disconnector ID | Relationship disconnected user ID | State | Period | Graph type | Alert date and time |
|---|---|---|---|---|---|---|---|
| C1 | 2016 Aug. 30 8:12 | U2 | U1 | Disconnection in progress | 90 | Graph 1 | 2016 Nov. 28 |
| C2 | 2016 Nov. 6 22:17 | U8 | U61 | Restoration in progress | 30 | Graph 2 | 2016 Dec. 6 |
| ... | ... | ... | ... | ... | ... | ... | ... |

Next, the user information management unit 201 refers to the relationship disconnection information, and in a case where the time has reached the alert date and time (step S266/Yes), the user information management unit 201 displays the alert on the client terminal 1 of the user (step S269). Here, an example of a relationship disconnection final confirmation UI will be described in FIG. 17. As illustrated in FIG. 17, when the display region 32 of the user information of the relationship disconnection in progress 100% is selected, a relationship disconnection confirmation UI 341 is displayed. In the relationship disconnection confirmation UI 341, texts such as "Is really relationship disconnected?", and a "Yes" button 342 and a "No. Reconfirm after N days" button 343 are displayed. An alert can be reset with the "No. Reconfirm after N days" button 343.

Next, in a case where the "Yes" button 342 has been selected and the relationship is really to be disconnected (step S272/Yes), the user information management unit 201 of the server 2 performs disconnection processing (step S275). Specifically, the user information management unit 201 deletes the pair of the ID of the friend with which the relationship is to be really disconnected and the corresponding relationship disconnection ID from the relationship disconnection ID list in the user information of the user, and deletes the relationship disconnection ID from the relationship disconnection information. Moreover, the user information management unit 201 deletes the ID of the friend from the friend ID list in the user information of the user, and deletes the ID of the user from the friend ID list of the friend. With the deletion, the relationship with the friend in the social media can be completely disconnected.

On the other hand, in a case where "No" has been selected in the relationship disconnection confirmation UI 341 (step S272/No), the user information management unit 201 performs alert extension processing (step S278). Specifically, the user information management unit 201 extends the alert date and time (see Table 4 above) of the relationship disconnection information. The number of extension days more amicably disconnected. Note that the interest (preference information) of the other side may be determined on the basis of content of posted information of the other side or may be determined on the basis of preference information (profile information or the like) collected (registered) in advance. In the present embodiment, the number of posts for each category obtained by analyzing posted information of the user is used as the preference information.

(3-2-1. Configuration)

Figure 18:
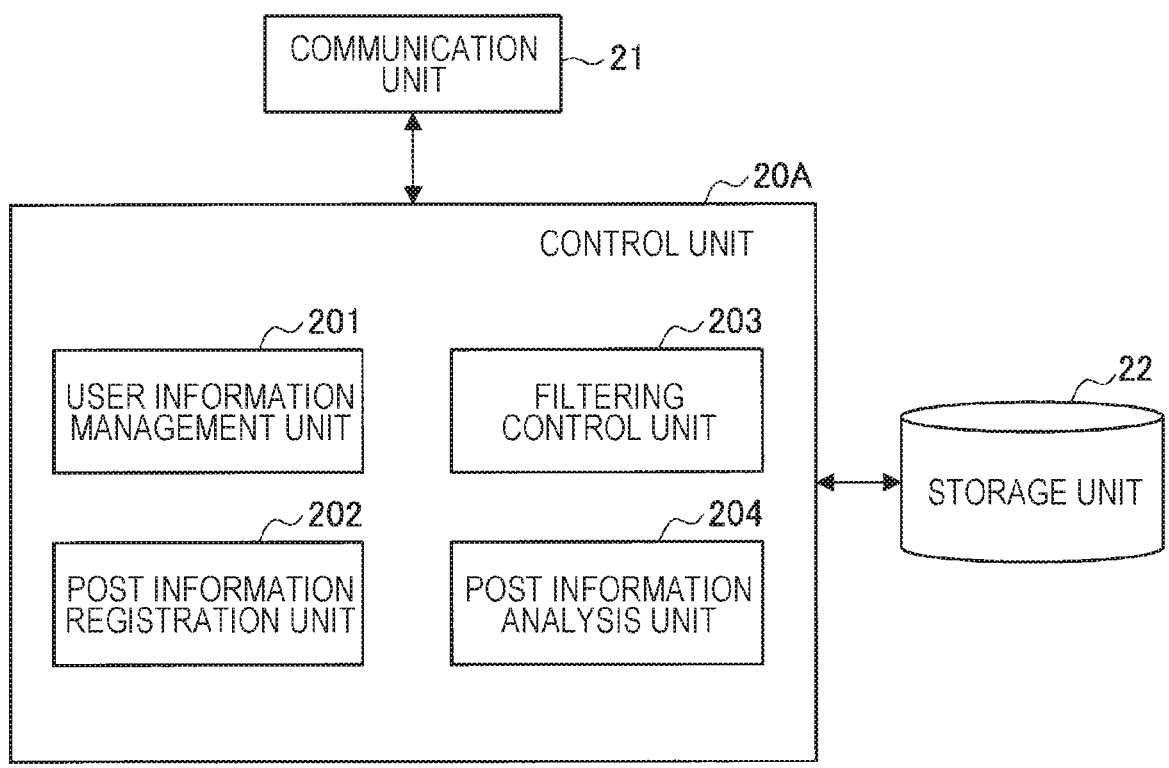
FIG. 18 is a diagram illustrating an example of a configuration of a server according to a second embodiment.

FIG. 18 is a diagram illustrating an example of a configuration of a server 2A according to the second embodiment. As illustrated in FIG. 18, a server 2A includes a control unit 20A, a communication unit 21, and a storage unit 22.

The control unit 20A functions as a user information management unit 201, a posted information registration unit 202, a filtering control unit 203, and a posted information analysis unit 204. Note that, here, parts different from the server 2 according to the first embodiment described with reference to FIG. 4 will be mainly described.

The posted information analysis unit 204 has a function to analyze posted content and extract a category. For example, the posted information analysis unit 204 can extract a category on the basis of semantic analysis of text of the posted content, word extraction, image analysis, voice recognition, tagging of posts, and the like. The extracted category is registered as posted information in association with a post ID. Furthermore, tabulation of post categories for each user is registered in user information as post category. Here, a data configuration example of the user information according to the present embodiment is illustrated in Table 5 below and a data configuration example of the posted information is illustrated in Table 6 below.

TABLE 5

| User ID | Name | Friend ID list | Post list ID | Post category | Response ID list | Relationship disconnection ID list |
|---|---|---|---|---|---|---|
| U1 | AAAA | [U2, U24] | [P7, P32, P58] | [Art: 2, Music: 1] | [R1] | [ ] |
| U2 | BBBB | [U1, U52] | [P2, P13] | [Music: 1, Mountain climbing: 1] | [R5, R37] | [U1: C1, U42: C13] |
| ... | ... | ... | ... | ... | ... | ... |

TABLE 6

| Post ID | Posting date and time | Poster ID | Posted content | Category | Response ID list | Displayability information |
|---|---|---|---|---|---|---|
| P1 | 2016 Feb. 4 13:55 | U46 | I made Thai curry. | Cooking | [R67] | [ ] |
| P2 | 2016 Jul. 7 14:32 | U2 | I climbed Mt. Fuji yesterday. | Mountain climbing | [R1] | [U1: 0, U52: 1] |
| ... | ... | ... | ... | ... | ... | ... |

In the example illustrated in Table 5 described above, it is understood that the post category of a user U1 has two in art and one in music, and a user U2 has one in music and one in mountain climbing.

(3-2-2. Operation Processing)

Figure 19:
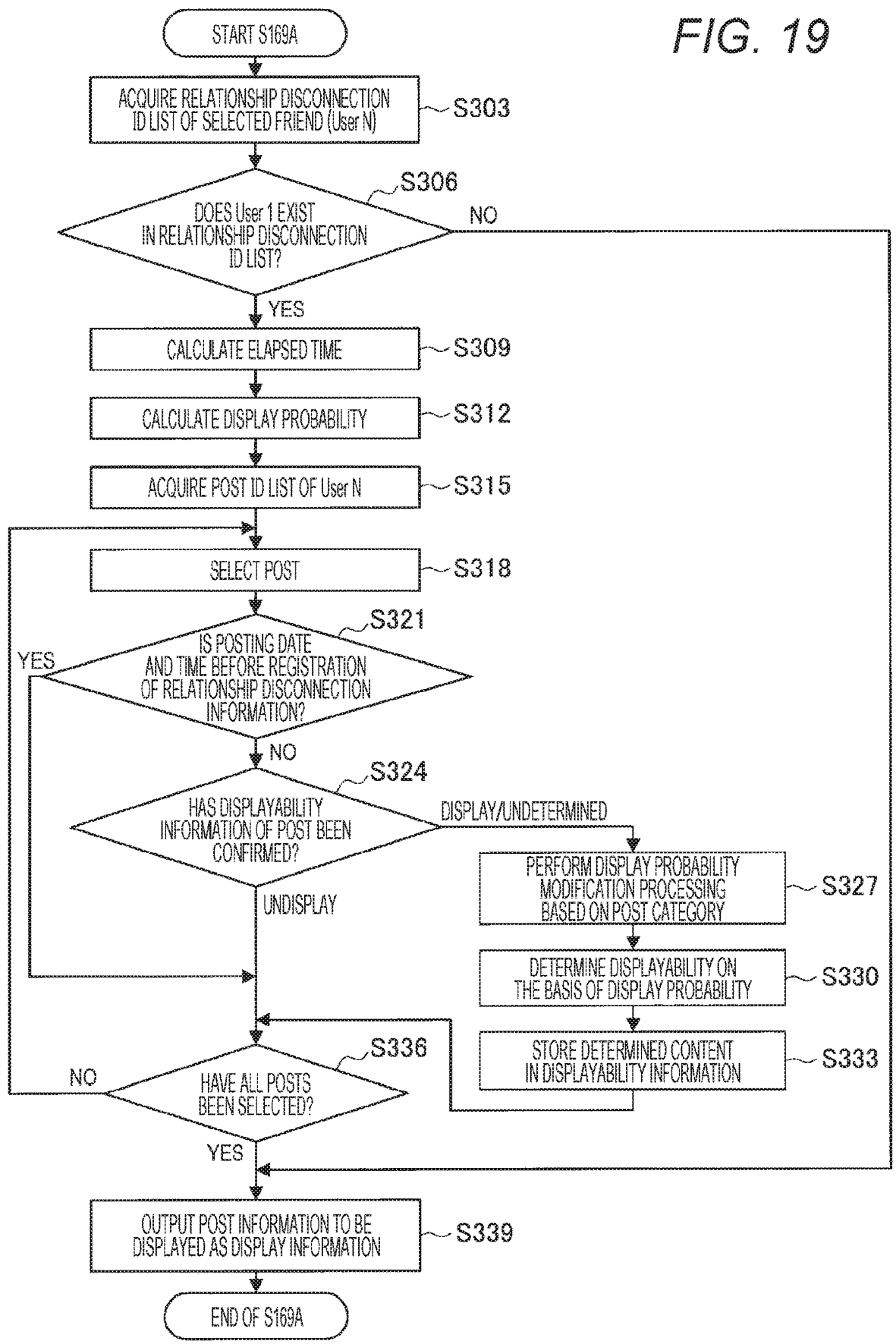
FIG. 19 is a flowchart illustrating filtering processing according to the second embodiment.

FIG. 19 is a flowchart illustrating filtering processing according to the second embodiment. The filtering processing according to the present embodiment is different from the filtering processing according to the first embodiment described with reference to FIG. 11 in performing "modification of display probability by category". The present embodiment is characterized in that the display probability calculated from a graph is not used as it is, but the display probability is modified according to the category of a post and used.

In other words, as illustrated in FIG. 19, first, in steps S303 to S324, similar processing to steps S183 to S204 illustrated in FIG. 11 is performed.

Next, the filtering control unit 203 of the server 2 performs display probability modification processing on the basis of the post category of a selected post (step S327). Here, the display probability modification processing in consideration of the post category will be described in detail with reference to FIG. 20.

Figure 20:
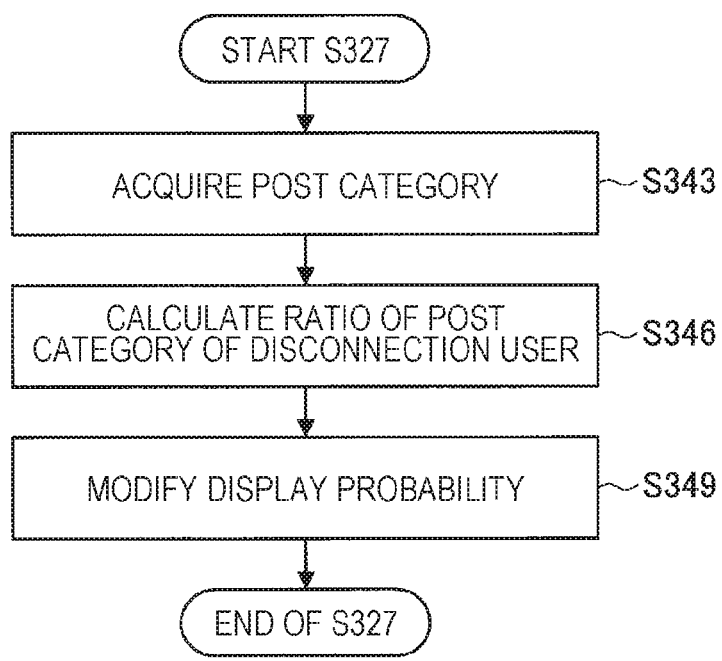
FIG. 20 is a flowchart illustrating display probability modification processing in consideration of a post category according to the second embodiment.

FIG. 20 is a flowchart illustrating the display probability modification processing in consideration of a post category according to the second embodiment. As illustrated in FIG. 20, first, the filtering control unit 203 acquires the category of the selected post (step S343).

Next, a ratio of the acquired category of the post is calculated on the basis of a tabulated result of the post categories in the user information of the relationship disconnection side (step S346) and modifies the display probability (step S349). Specifically, the display probability is modified by, for example, the following expression 1. In the following expression 1, a modified display probability P' is calculated using an original display probability P and a ratio Pc of the category.

$$P' = P - (1-P) \times Pc \quad \text{Expression 1}$$

For example, in a case where the selected post is the post of the user U2 and the category is music, the ratio of music that is the same category is calculated from the post category in the user information of the other user U1 with which the user 2 wants to disconnect relationship. For example, as illustrated in Table 5 above, in the case where the post category of the user U1 has two in art and one in music, the ratio of the music category is 0.33 (1/3). In a case where the original display probability calculated in step S312 is 0.6, the display probability is modified as follows on the basis of the expression 1.

$$P' = 0.6 - (1-0.6) \times 0.33 = 0.47$$

Similarly, for example, in a case where the category of the selected post of the user U2 is mountain climbing, the ratio of the mountain climbing category of the user U1 of the disconnection side is 0 (=0/3) from the post category of the user information, and thus the display probability is modified as follows in a case where the original display probability is 0.6.

$$P' = 0.6 - (1-0.6) \times 0 = 0.6$$

As described above, the display probability of posts of the music category in which the relationship disconnection side has a high interest becomes lower than the mountain climbing category, and the posts in the music category are less likely to be displayed to the relationship disconnection side. As a result, the number of no-interest posts of the other side increases.

Here, the display probability has been modified using the category of posts posted by the disconnection side as the preference information, as an example. However, the present embodiment is not limited to the example, and a category of posts of another user to which the disconnection side has responded (has commented) may also be used as the preference information. In this case, the number of categories of posts of the another user to which the disconnection side has responded is tabulated as the response category, and the display probability is similarly modified with the ratio of the response category. Which post the disconnection side has responded to can be grasped on the basis of the response information stored in the storage unit 22. Here, a data configuration example of the response information will be described in Table 7 below.

TABLE 7

| Response ID | Response date and time | Post ID | Responder ID | Response type | Response content |
|---|---|---|---|---|---|
| R1 | 2016 Jul. 7 14:32 | P2 | U1 | Like | — |
| R2 | 2016 Nov. 27 2:52 | P63 | U82 | Comment | It was tough. |
| ... | ... | ... | ... | ... | ... |

Next, returning to FIG. 19, the filtering control unit 203 determines displayability on the basis of the modified display probability (step S330) and stores determined content in displayability information of the posted information (step S33).

The processing in steps S318 to S333 is repeated until all the acquired posts are selected (step S336).

Then, in a case where all the posts have been selected and the above processing has been performed (step S336/Yes), the filtering control unit 203 outputs the posted information to be displayed as the display information (step S339).

3-3. Third Embodiment

In the above-described embodiments, filtering for not displaying posts by the user to the relationship disconnection side has been mainly described. In the present embodiment, filtering for not displaying posts of a relationship disconnection side to a user side, and automatically responding by a server 2 in a case where the disconnection side responds to a post of the user (comments on the post or the like) during loose disconnection, to cause the other side not to notice relationship disconnection are also possible. Such post display processing and automatic response on the user side will be described with reference to FIGS. 21 and 22.

Figure 21:
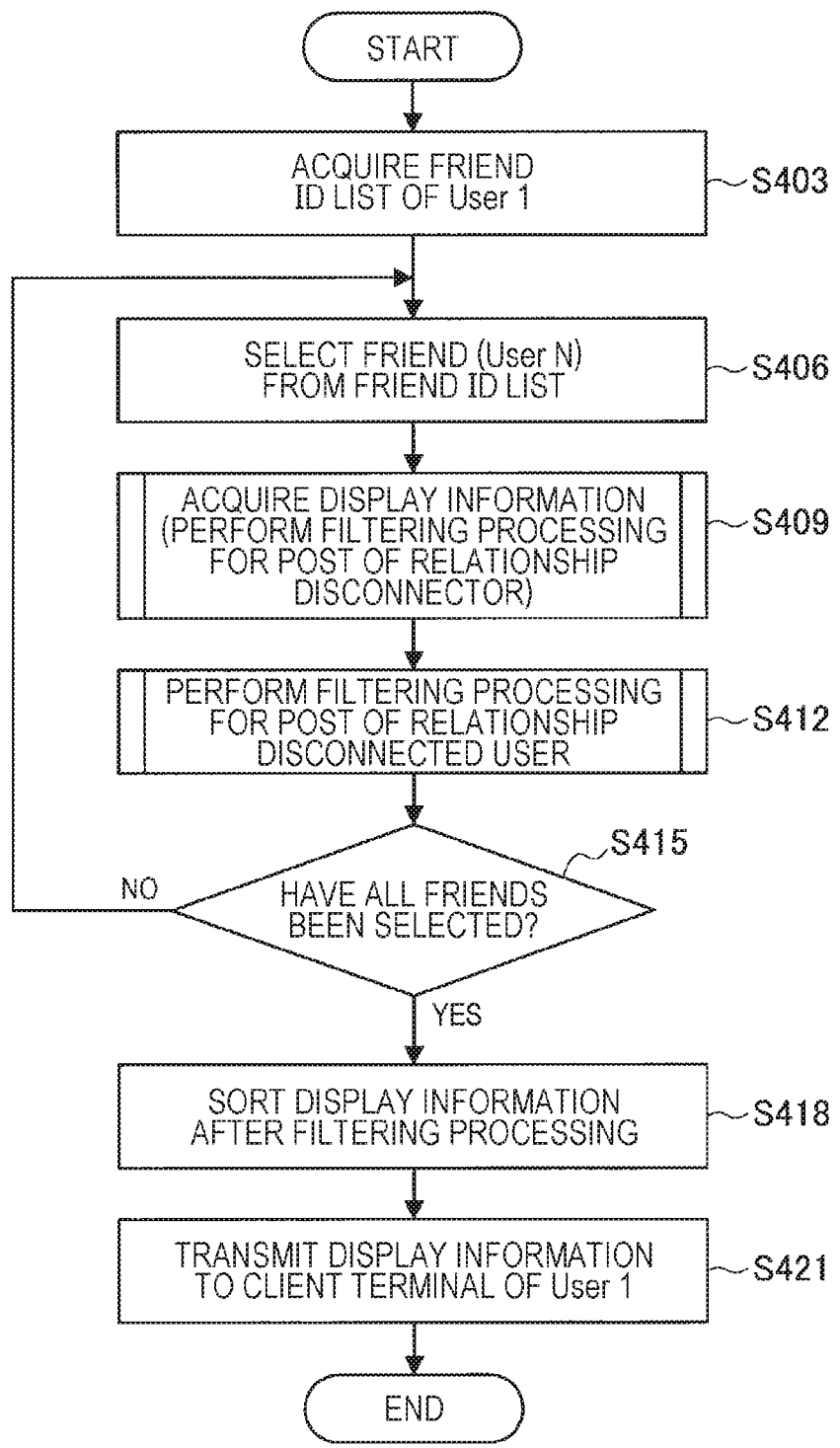
FIG. 21 is a flowchart illustrating display information acquisition processing according to a third embodiment.

FIG. 21 is a flowchart illustrating display information acquisition processing according to a third embodiment. The processing illustrated in FIG. 21 is different from the display information acquisition processing in the first embodiment illustrated in FIG. 10 in that, in a case where User 1 registers relationship disconnection information for disconnecting relationship with User N in step S412, filtering processing of User N side (relationship disconnected user side) in display of User 1 side (relationship disconnector side) is also performed (in this case, User 1 is the relationship disconnector and User N is the relationship disconnected user). The other processing is similar to the processing illustrated in FIG. 10. Specifically, in step S409, the filtering processing for posts of User N (relationship disconnector) on display on User 1 side is performed on the basis of the relationship disconnection information for disconnecting the relationship with User 1 by User N, similarly to step S169.

Next, in step S412, the filtering processing for posts of User N (relationship disconnected user) on display on User 1 side is performed on the basis of the relationship disconnection information for disconnecting the relationship with User N by User 1. Such filtering processing will be specifically described with reference to FIG. 22.

Figure 22:
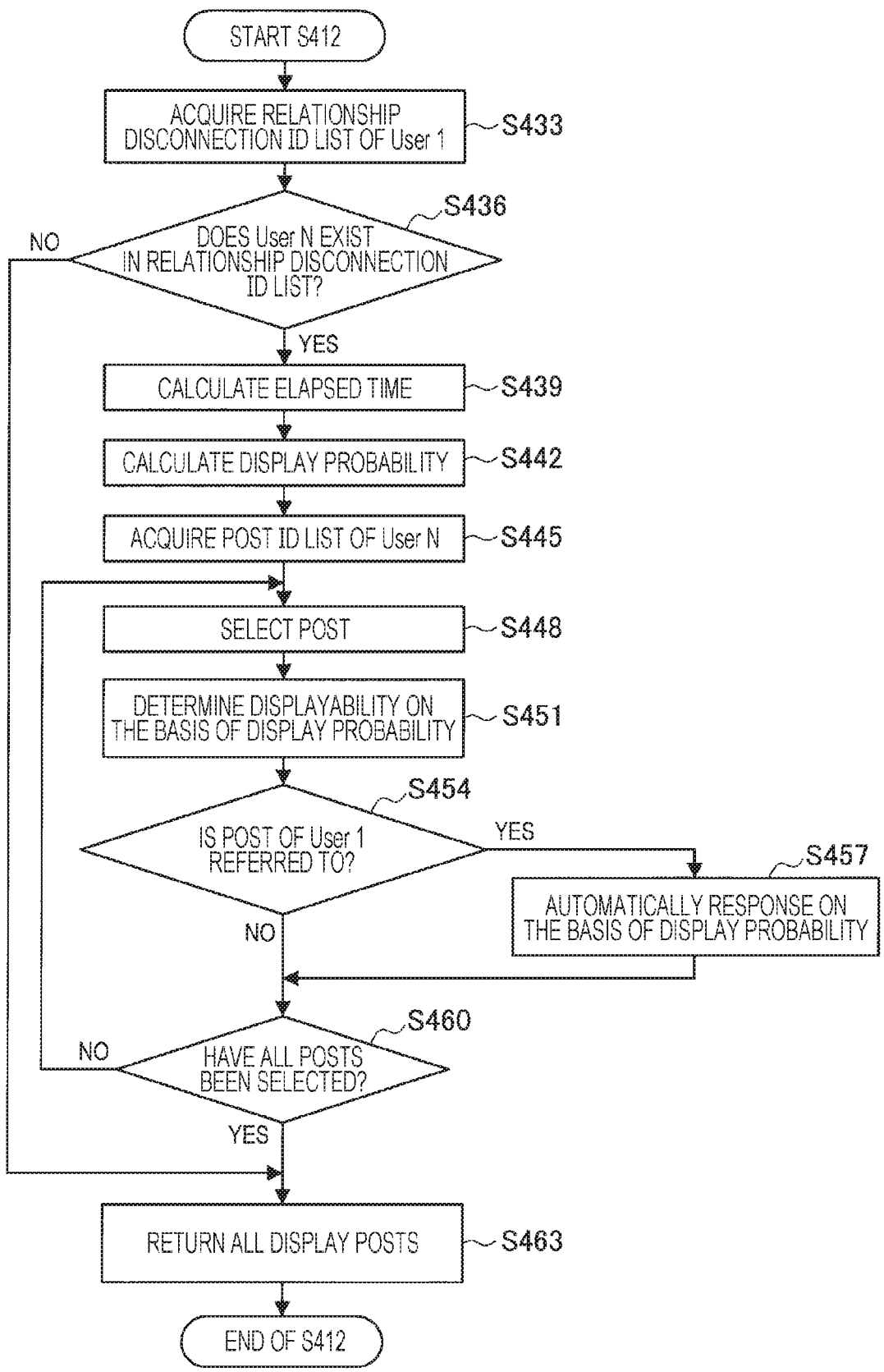
FIG. 22 is a flowchart illustrating filtering processing according to the third embodiment.

FIG. 22 is a flowchart illustrating the filtering processing according to the third embodiment. As illustrated in FIG. 22, a filtering control unit 203 acquires a relationship disconnection ID list of User 1 from user information (see Table 1 above) (step S433), and confirms whether or not User N exists in the relationship disconnection ID list (step S436).

In a case where User N exists (step S436/Yes), the filtering control unit 203 extracts a relationship disconnection ID paired with an ID of User N from the relationship disconnection ID list, calculates an elapsed time from registration date and time of the relationship disconnection information to the present by reference to the relationship disconnection information (see Table 2 above) corresponding to the extracted relationship disconnection ID (step S439), and calculates a display probability at present by reference to a specified graph type (step S442). Note that the display probability is assumed to be lower than the case of filtering posts of the relationship disconnector (User N) on the display of the relationship disconnected user (User 1) in step S409 (the display probability of 0% is good in the extreme).

Next, the filtering control unit 203 acquires a post ID list (see Table 1 above) from user information of User N (relationship disconnected user) (step S445).

Next, the filtering control unit 203 selects a post from the post ID list (step S448) and determines displayability on the basis of the display probability (step S451). Note that, in a case where User 1 and User N want to disconnect the relationship with each other, the posts of User N are filtered as User 1 (relationship disconnected user) and User N (relationship disconnector) in step S409, and the posts of User N are filtered as User 1 (relationship disconnector) and User N (relationship disconnected user) in step S412.

Next, whether or not a post of User 1 is referenced by User N is confirmed (step S454). "Reference" is a case of making some kind of response, such as giving a commend to the post of User 1, or quoting the post of User 1 in a post of User N. In a case of being referenced and in a case where User 1 does not respond, there is a possibility that the relationship with User N is deteriorated (the relationship disconnected may be noticed by User N), and thus the server 2 automatically responds as described below.

In other words, in a case of being referenced (step S454/Yes), the filtering control unit 203 performs automatic response on the basis of the display probability (step S457). The relationship disconnection is difficult if the automatic response is made to all of references. Therefore, the automatic response is performed according to the display probability, whereby the number of automatic responses can be gradually reduced with passage of time. Note that content of the automatic response is assumed to be simple responses such as "thanks!", "like!", and the like.

The processing in steps S448 to S457 is repeated until all the acquired posts are selected (step S460).

Then, in a case where all the posts have been selected and the above processing has been performed (step S460/Yes), the filtering control unit 203 outputs posted information to be displayed as display information (step S463).

As described above, the relationship disconnector feeling terrible by seeing a post of the relationship disconnected user (the other side with which the relationship disconnector wants to disconnect the relationship), deteriorating the relationship because the relationship disconnector does not respond to the comment of the relationship disconnected user, and the relationship disconnector feeling terrible by being forced to respond to the comment of the relationship disconnected user can be avoided (labor is avoided).

Furthermore, in a case where the user desires to eliminate the relationship with the other side with which the user wants to disconnect the relationship as much as possible, the filtering control unit 203 may not preferentially display referenced posts or may not display the referenced posts at all in determining the displayability from the display probability.

3-4. Fourth Embodiment

Next, a fourth embodiment will be described with reference to FIG. 23. In the present embodiment, in a case where a user and a disconnection side have a common friend, posts of the user are filtered for the common friend similarly to the relationship disconnection side in order to prevent the relationship disconnection side from seeing the posts via the friend, thereby enabling more reliable disconnection of relationship.

Figure 23:
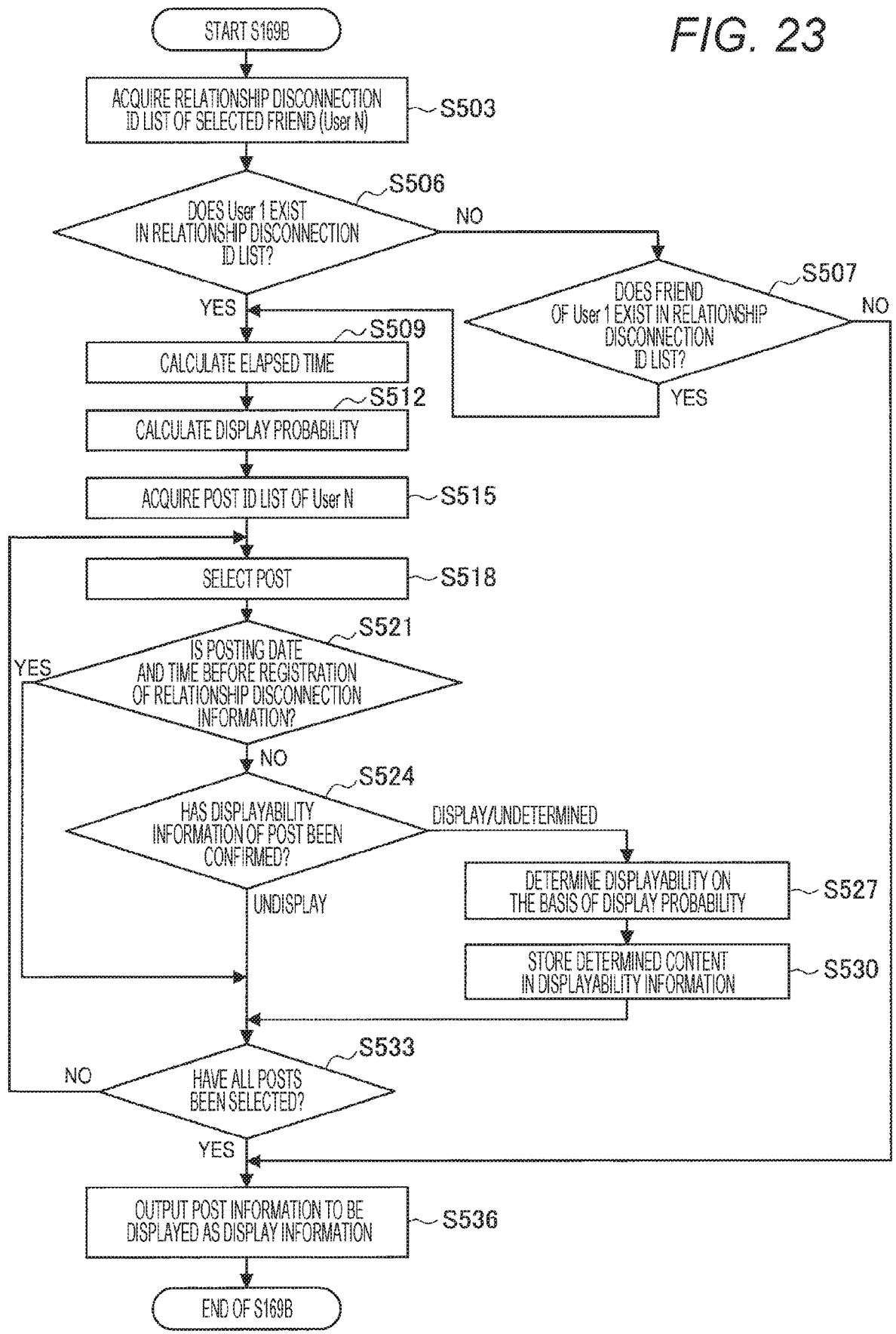
FIG. 23 is a flowchart illustrating filtering processing according to a fourth embodiment.

FIG. 23 is a flowchart illustrating filtering processing according to the fourth embodiment. The processing illustrated in FIG. 23 is different from the filtering processing according to the first embodiment illustrated in FIG. 11 in confirming whether or not a friend (hereinafter referred to as "User M") of User 1 exists in a relationship disconnection ID of User N (step S507) even in a case where User 1 does not exist in the relationship disconnection ID of User N (step S506/No).

The present embodiment is characterized in performing post filtering processing of User N illustrated in steps S509 to S533 even in a case where a friend (hereinafter referred to "User M") of User 1 exists in the relationship disconnection ID of User N (step S507/Yes). In other words, in a case where User N wants to disconnect relationship with User M, posts of User N are not displayed on a display screen of User 1 who is the common friend of User M, whereby User M seeing the posts of User N via User 1 can be avoided even in a case where there is a function to see posts of "friend of friend".

Note that processing in steps S509 to S536 is similar to the processing in steps S189 to S216 in FIG. 11, and thus detailed description is omitted here.

3-5. Fifth Embodiment

Next, a fifth embodiment will be described with reference to FIGS. 24 and 25. In the present embodiment, an emotion of a user when the user determines disconnection of relationship with the other side is estimated and option parameters of the relationship disconnection are set according to the emotion. Usually, people take an extreme action from temporary strong feeling. Therefore, the present embodiment enables recommendation of an appropriate period of the relationship disconnection and a graph type of a display probability according to the emotion so that the user does not regret.

Figure 24:
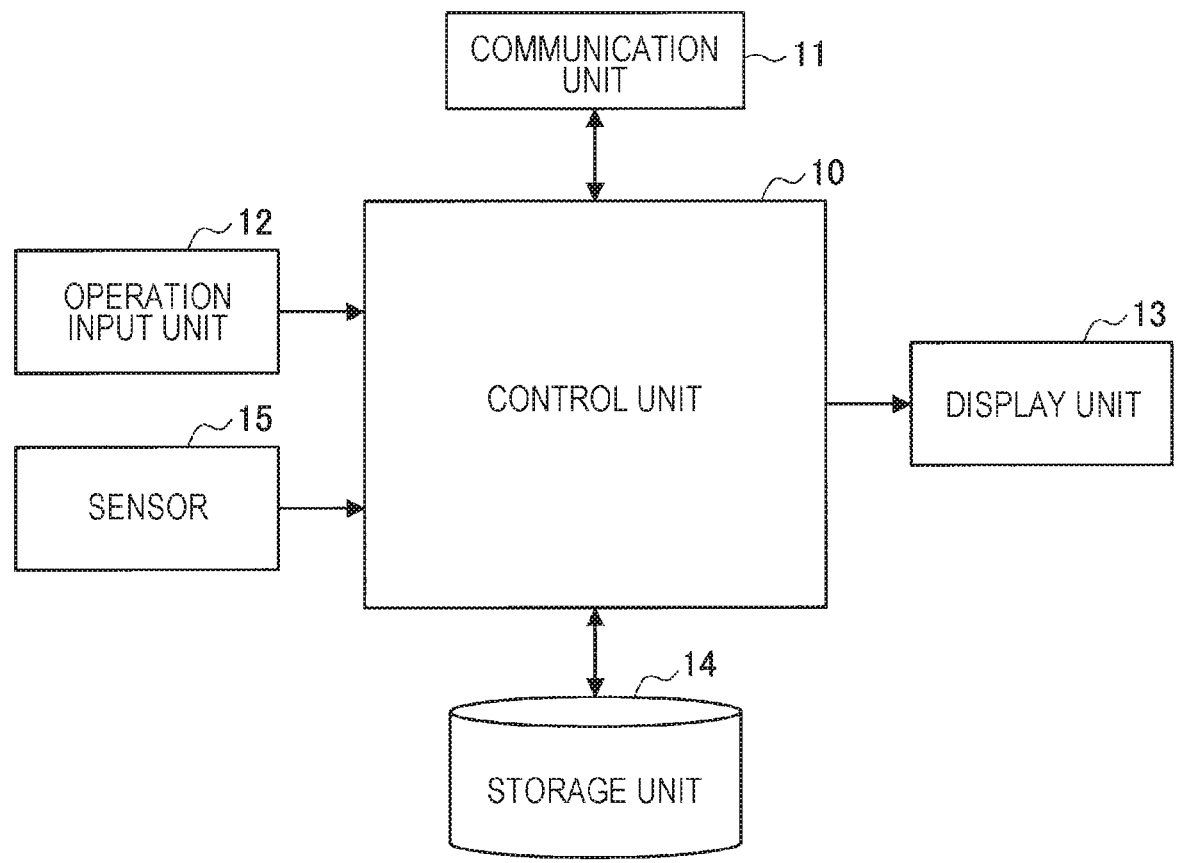
FIG. 24 is a diagram illustrating an example of a configuration of a client terminal according to a fifth embodiment.

FIG. 24 is a diagram illustrating an example of a configuration of a client terminal 1A according to the fifth embodiment. As illustrated in FIG. 24, the client terminal 1A further includes a sensor 15 for detecting information for estimating user's emotion. Specifically, the sensor 15 may be a biological sensor (such as a pulse sensor), a camera for detecting a facial expression, or the like.

Estimation of the emotion may be performed by a control unit 10 or may be performed on a server 2 side. Emotion information at the time of registering relationship disconnection information is stored in association with a relationship disconnection ID as in Table 8 below.

An emotion may be expressed by a basic emotion such as joy or anger, but here, as an example, an emotion is two-dimensionally expressed by valence and arousal, and both are normalized from 0 to 1.

In the example illustrated in Table 8 above, in a relationship disconnection ID: C1, the emotion at the time of registering the relationship disconnection information is (0.1, 0.9), which indicates that the relationship disconnection has been set in a state where the valence is extremely low and the arousal is extremely high, and the user is very unpleasant and excited. In a case where the user tries to disconnect the relationship with the other side from temporary strong feeling, the user often regrets when cooling down.

Figure 25:
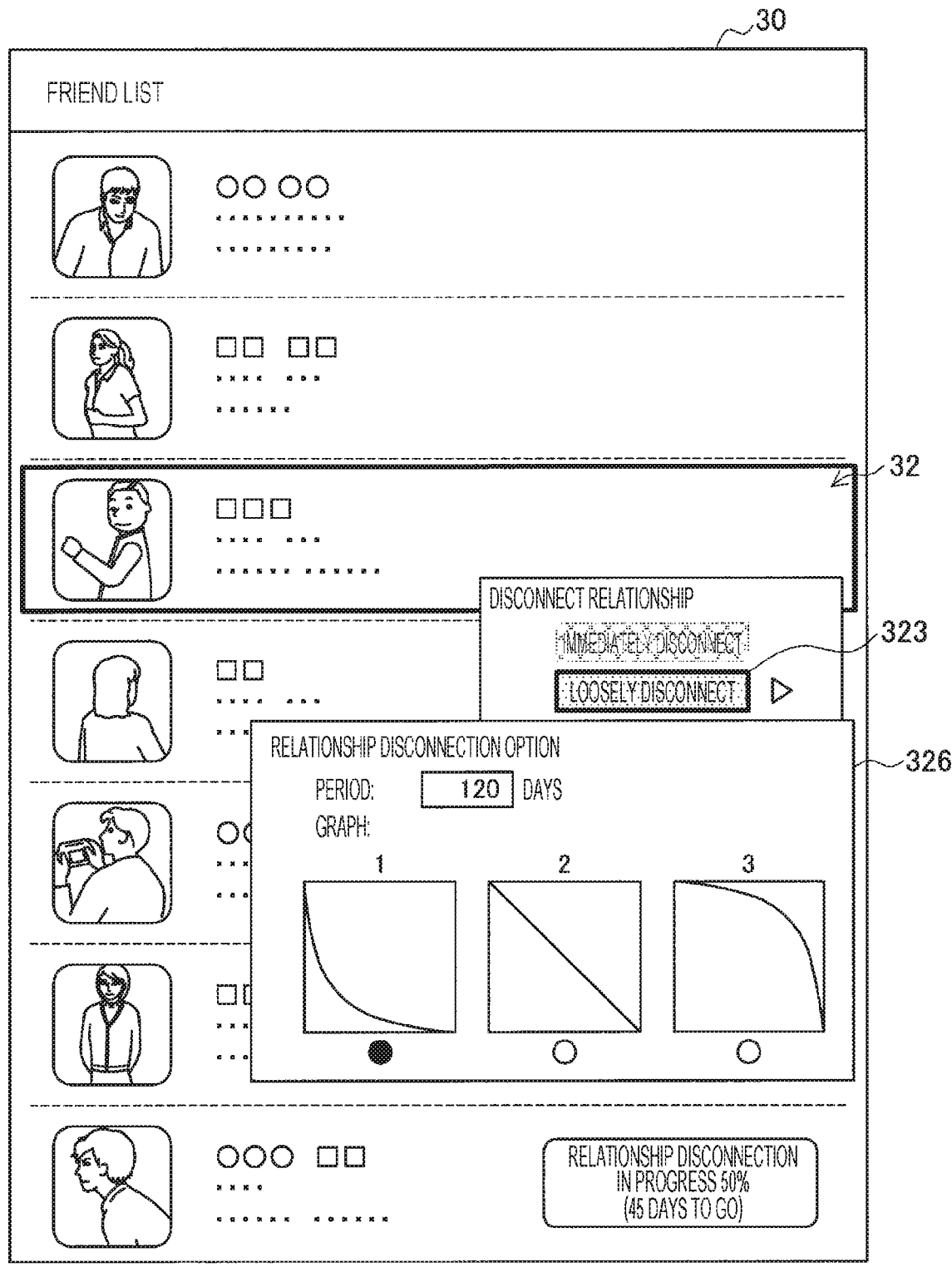
FIG. 25 is a view illustrating an example of a relationship disconnection UI according to the fifth embodiment.

Therefore, in the case of strong feeling where the valence is low and the arousal is high, a control unit 20 of the server 2 grays out a relationship disconnection UI not to allow selection of "immediately disconnect", sets a default period to be long such as 120 days in the option, or sets a default graph type to graph 1 illustrated on the far left in which the display probability rapidly lowers at first but the display probability then does not decrease a lot, as illustrated in FIG. 25.

(Emotion Estimation)

The client terminal 1A may be a smartphone, a wearable terminal such as a smart band, or the like, and is provided with an acceleration sensor, a gyro sensor, a biometric sensor such a pulse sensor, or a pressure sensor, and may be further provided with a camera.

Registration of the relationship disconnection information can also be performed by setting an operation to swing down the smartphone with hand or swing down the hand with the wearable terminal as a trigger after selecting a friend, in addition to the method of selecting the disconnection side from the list of the friend information, as described above. At this time, the value of arousal can also be estimated by the magnitude of downward acceleration. Furthermore, the arousal can be determined from the height of the pulse from the pulse sensor or the arousal can be determined from the magnitude of pressure of the pressure sensor.

Note that, in a case where an action such as walking is estimated from the acceleration sensor, it can be understood that the pulse height is not due to the arousal from an emotion.

Furthermore, by recognizing the facial expression when operating the relationship disconnection UI with the camera provided in a display unit, the valence can be determined from the degree of facial expression of when angry, for example.

4. CONCLUSION

As described above, in the information processing system according to the embodiment of the present disclosure, a

TABLE 8

| Relationship disconnection ID | Date and time | Relationship disconnector ID | Relationship disconnected user ID | State | Period | Graph type | Emotion |
|---|---|---|---|---|---|---|---|
| C1 | 2016 Aug. 30 8:12 | U2 | U1 | Disconnection in progress | 90 | Graph 1 | (0.1, 0.9) |
| C2 | 2016 Nov. 6 22:17 | U8 | U61 | Restoration in progress | 30 | Graph 2 | (0.3, 0.6) |
| ... | ... | ... | ... | ... | ... | ... | ... | relationship with the other side connected in a social media service can be loosely disconnected.

The favorable embodiments of the present disclosure have been described in detail with reference to the accompanying drawings, but the present technology is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

For example, a computer program for causing the hardware such as the CPU, ROM, and RAM built in the above-described client terminal 1 or server 2 to exert the functions of the client terminal 1 or server 2. Furthermore, a computer readable storage medium storing the computer program is also provided.

Furthermore, the effects described in the present specification are merely illustrative or exemplary and are not restrictive. That is, the technology according to the present disclosure can exhibit other effects obvious to those skilled in the art from the description of the present specification in addition to or in place of the above-described effects.

Note that the present technology can also have the following configurations.

(1)

An information processing system including:

an accumulation unit configured to accumulate friend information indicating a friend relationship between users registered in a social media service and posted information posted by a user;

a communication unit configured to receive a posted information request from a user of a client device and reply with the posted information; and a control unit configured to, when receiving disconnection candidate user information from a specific user via the communication unit, the disconnection candidate user information indicating a user with which the specific user wishes to disconnect a relationship, cause the accumulation unit to store the disconnection candidate user information in association with the specific user, and when receiving the posted information request from the user of the client device via the communication unit, cause the communication unit to reply to the user of the client device after filtering posted information posted by the specific user according to passage of predetermined time, depending on whether or not the user of the client device is included in disconnection candidate users indicated by the disconnection candidate user information stored in association with the specific user registered in the friend information of the user of the client device.

(2)

The information processing system according to (1), in which the control unit filters the posted information posted by the specific user according to setting information specifying a method of the filtering received from the specific user via the communication unit.

(3)

The information processing system according to (2), in which the control unit performs control to delete the specific user from the friend information of the user of the client device on the basis of approval by the specific user when a period of the filtering ends.

(4)

The information processing system according to any one of (1) to (3), in which the control unit deletes the disconnection candidate user information stored in association with the specific user when receiving a relationship restoration request requesting relationship restoration with the disconnection candidate user from the specific user via the communication unit.

(5)

The information processing system according to any one of (1) to (3), in which the control unit starts to cancel the filtering of the posted information posted by the specific user according to a relationship restoration request requesting relationship restoration with the disconnection candidate user and setting information specifying a method of the relationship restoration.

(6)

The information processing system according to any one of (1) to (5), in which a category liked by a user is stored for each user in the accumulation unit, and regarding the posted information posted by the specific user, the control unit performs control to preferentially filter the posted information in the category liked by the user of the client device.

(7)

The information processing system according to any one of (1) to (6), in which, when receiving the posted information request from the specific user via the communication unit, the control unit causes the communication unit to reply to the specific user after filtering the posted information posted by the user of the client device according to passage of predetermined time, depending on whether or not the user of the client device is included in the disconnection candidate users indicated by the disconnection candidate user information stored in association with the specific user.

(8)

The information processing system according to (7), in which, when detecting a post or a reaction regarding the specific user by the user of the client device, the control unit automatically generates and uploads a response of the specific user to the post or the reaction.

(9)

The information processing system according to any one of (1) to (8), in which, when receiving the posted information request from the user of the client device via the communication unit, the control unit replies to the user of the client device after filtering the posted information posted by the specific user according to passage of predetermined time, depending on whether or not the user of the client device is included or whether or not a user registered in the friend information of the user of the client device is included in the disconnection candidate users indicated by the disconnection candidate user information stored in association with the specific user registered in the friend information of the user of the client device.

(10)

The information processing system according to any one of (1) to (9), in which the communication unit receives information regarding an emotion of the specific user at a time of the reception, together with disconnection candidate user information indicating users with which the specific user wishes to disconnect a relationship, from a client device of the specific user, and when receiving the posted information request from the user of the client device via the communication unit, the control unit causes the communication unit to reply to the user of the client device after filtering the posted information posted by the specific user according to passage of predetermined time based on the emotion of the specific user, depending on whether or not the user of the client device is included in the disconnection candidate users indicated by the disconnection candidate user information stored in association with the specific user registered in the friend information of the user of the client device.

(11)

An information processing method, by a processor, including:

accumulating friend information indicating a friend relationship between users registered in a social media service and posted information posted by users in an accumulation unit;

receiving a posted information request from a user of a client device and replying with the posted information via a communication unit;

when receiving disconnection candidate user information from a specific user via the communication unit, the disconnection candidate user information indicating users with which the specific user wishes to disconnect a relationship, causing the accumulation unit to store the disconnection candidate user information in association with the specific user; and when receiving the posted information request from the user of the client device via the communication unit, causing the communication unit to reply to the user of the client device after filtering posted information posted by the specific user according to passage of predetermined time, depending on whether or not the user of the client device is included in disconnection candidate users indicated by the disconnection candidate user information stored in association with the specific user registered in the friend information of the user of the client device.

REFERENCE SIGNS LIST 1, 1a Client terminal
2 Server
10 Control unit
11 Communication unit
12 Input unit
13 Output unit
14 Storage unit
15 Sensor
20 Control unit
20A Control unit
21 Communication unit
22 Storage unit
201 User information management unit
202 Posted information registration unit
203 Filtering control unit
204 Posted information analysis unit

The invention claimed is:

1. An information processing system, comprising:
a processor configured to:
accumulate friend information and first posted information in a memory, wherein
the friend information indicates a friend relationship between a first user of a first plurality of users and a second plurality of users of the first plurality of users,
the first plurality of users is registered in a social media service,
the first posted information is posted by the first plurality of users, and
the first posted information includes second posted information posted by a second user of the second plurality of users;
receive a first posted information request from a client device associated with the first user;
receive disconnection candidate user information from the second user;
control the memory to store, based on the reception of the disconnection candidate user information from the second user, the disconnection candidate user information in association with the second user, wherein the disconnection candidate user information indicates a third plurality of users among the first plurality of users with which the second user wishes to disconnect a relationship;
receive setting information that indicates a graph type, wherein the graph type indicates a change in a display probability of the second posted information with respect to an elapsed time from the reception of the disconnection candidate user information;
calculate, based the graph type, the display probability of the second posted information accumulated in the memory;
filter the second posted information accumulated in the memory, wherein the second posted information is filtered based on:
the calculated display probability of the second posted information accumulated in the memory,
the reception of the first posted information request from the client device,
the elapsed time from the reception of the disconnection candidate user information, and
whether the first user is included in the third plurality of users indicated by the disconnection candidate user information; and
control transmission of a reply to the client device of the first user based on the filtered second posted information.

2. The information processing system according to claim 1, wherein the processor is further configured to delete the second user from the friend information of the first user based on approval by the second user at an end of a filtering period.

3. The information processing system according to claim 2, wherein the processor is further configured to acquire the filtering period based on a user input by the second user.

4. The information processing system according to claim 1, wherein the processor is further configured to:
receive a relationship restoration request from the second user, wherein the relationship restoration request is from the second user to request relationship restoration with one of the third plurality of users; and
delete, based on the reception of the relationship restoration request, the disconnection candidate user information stored in association with the second user.

5. The information processing system according to claim 1, wherein the processor is further configured to cancel the filtering of the second posted information based on:

a relationship restoration request for relationship restoration with one of the third plurality of users, and
information that specifies a method of the relationship restoration.

6. The information processing system according to claim 1, wherein the processor is further configured to:
store, in the memory, a category liked by each user of the first plurality of users and the second posted information posted by the second user; and
preferentially filter the second posted information in the category liked by the first user.

7. The information processing system according to claim 1, wherein
the first posted information further includes third posted information posted by the first user,
the processor is further configured to filter the third posted information accumulated in the memory, and
the third posted information is filtered based on:
the elapsed time from the reception of the disconnection candidate user information,
a second posted information request from the second user, and
whether the first user is included in the third plurality of users indicated by the disconnection candidate user information.

8. The information processing system according to claim 7, wherein the processor is further configured to:
detect one of a post or a reaction regarding the second user by the first user; and
automatically generate and upload a response of the second user to the one of the post or the reaction.

9. The information processing system according to claim 1, wherein the processor is further configured to filter the second posted information based on:
the first posted information request from the first user,
the elapsed time from the reception of the disconnection candidate user information, and
whether a third user of the first plurality of users registered in the friend information of the first user is included in the third plurality of users indicated by the disconnection candidate user information.

10. The information processing system according to claim 1, wherein the processor is further configured to:
receive information regarding an emotion of the second user at a time of the reception of the disconnection candidate user information, from a client device of the second user; and
filter the second posted information based on:
the elapsed time that is based on the emotion of the second user, and
whether the first user is included in the third plurality of users indicated by the disconnection candidate user information.

11. The information processing system according to claim 1, wherein the processor is further configured to:
determine a displayability of the second posted information based on the calculated display probability;
store the determined displayability as displayability information of the second posted information; and
filter the second posted information based on the displayability information and the second posted information posted prior to the reception of the disconnection candidate user information.

12. An information processing method, comprising:
accumulating, by a processor, friend information and first posted information in a memory, wherein
the friend information indicates a friend relationship between a first user of a first plurality of users and a second plurality of users of the first plurality of users,
the first plurality of users is registered in a social media service,
the first posted information is posted by the first plurality of users, and
the first posted information includes second posted information posted by a second user of the second plurality of users;
receiving, by the processor, a posted information request from a client device associated with the first user;
receiving, by the processor, disconnection candidate user information from the second user;
controlling, by the processor, the memory to store the disconnection candidate user information in association with the second user based on the reception of the disconnection candidate user information from the second user, wherein the disconnection candidate user information indicates a third plurality of users among the first plurality of users with which the second user wishes to disconnect a relationship;
receiving, by the processor, setting information that indicates a graph type, wherein the graph type indicates a change in a display probability of the second posted information with respect to an elapsed time from the reception of the disconnection candidate user information;
calculating, by the processor based the graph type, the display probability of the second posted information accumulated in the memory;
filtering, by the processor, the second posted information accumulated in the memory, wherein the second posted information is filtered based on:
the calculated display probability of the second posted information accumulated in the memory;
the reception of the posted information request from the first user,
the elapsed time from the reception of the disconnection candidate user information, and
whether the first user is included in the third plurality of users indicated by the disconnection candidate user information; and
controlling, by the processor, transmission of a reply to the client device of the first user based on the filtered second posted information.

* * * * *